United States Patent
Yang et al.

(10) Patent No.: US 11,362,944 B2
(45) Date of Patent: Jun. 14, 2022

(54) ROUTING METHOD AND DEVICE

(71) Applicant: Huawei Technologies Co., Ltd., Shenzhen (CN)

(72) Inventors: Qingchang Yang, Xi'an (CN); Qinghua Yu, Dongguan (CN)

(73) Assignee: HUAWEI TECHNOLGOIES CO., LTD., Shenzhen (CN)

(*) Notice: Subject to any disclaimer, the term of this patent is extended or adjusted under 35 U.S.C. 154(b) by 0 days.

(21) Appl. No.: 16/991,214

(22) Filed: Aug. 12, 2020

(65) Prior Publication Data
US 2020/0374228 A1    Nov. 26, 2020

Related U.S. Application Data

(63) Continuation of application No. PCT/CN2018/076755, filed on Feb. 13, 2018.

(51) Int. Cl.
*H04L 45/00* (2022.01)
*H04L 45/12* (2022.01)
(Continued)

(52) U.S. Cl.
CPC ............ *H04L 45/70* (2013.01); *H04L 45/123* (2013.01); *H04L 45/124* (2013.01);
(Continued)

(58) Field of Classification Search
CPC combination set(s) only.
See application file for complete search history.

(56) References Cited

U.S. PATENT DOCUMENTS 9,417,901 B2    8/2016  Choi et al.
2009/0059937 A1*  3/2009  Kanada ............... H04L 41/5019
                                                            370/401
(Continued)

FOREIGN PATENT DOCUMENTS

CN    1864368 A    11/2006
CN    101119308 A   2/2008
(Continued)

OTHER PUBLICATIONS

Liu Jing, "Design and Research of Mapping System Based on the Separation of Control Plane and Data Plane," Beijing Jiaotong University, Apr. 2016, with an English abstract, 91 pages.
(Continued)

*Primary Examiner* — Xavier S Wong
(74) *Attorney, Agent, or Firm* — Conley Rose, P.C.

(57) ABSTRACT

A routing method and a device to provide a routing path that satisfies a quality of service (QoS) requirement, where the routing method includes performing QoS measurement on a path between the first routing node and a reachable adjacent routing node, to obtain a QoS parameter set of the path between every two adjacent routing nodes, reporting the QoS parameter set to the control node, receiving one or more routing tables of routing performed from the first routing node to the other routing node that are delivered by the control node, and receiving a packet, determining, from the one or more routing tables, a routing table corresponding to an identifier of the packet, and forwarding the received packet based on the routing table.

20 Claims, 13 Drawing Sheets

(51) Int. Cl.
*H04L 43/0829* (2022.01)
*H04L 43/0852* (2022.01)
*H04L 43/087* (2022.01)
*H04L 45/64* (2022.01)

(52) U.S. Cl.
CPC ........ *H04L 43/087* (2013.01); *H04L 43/0829* (2013.01); *H04L 43/0858* (2013.01); *H04L 45/64* (2013.01)

(56) References Cited

U.S. PATENT DOCUMENTS

| | | | |
|---|---|---|---|
| 2009/0327514 A1* | 12/2009 | Foschiano | H04L 45/64 709/233 |
| 2011/0051738 A1 | 3/2011 | Xu | |
| 2014/0022951 A1* | 1/2014 | Lemieux | H04L 45/22 370/255 |
| 2014/0185531 A1* | 7/2014 | Liu | H04L 45/125 370/329 |
| 2014/0201738 A1 | 7/2014 | Choi et al. | |
| 2016/0380878 A1 | 12/2016 | Bugenhagen et al. | |
| 2017/0078176 A1* | 3/2017 | Lakshmikantha | H04L 47/562 |
| 2017/0207997 A1* | 7/2017 | Martin | H04L 41/0813 |
| 2019/0124704 A1* | 4/2019 | Sun | H04W 76/10 |

FOREIGN PATENT DOCUMENTS

| | | |
|---|---|---|
| CN | 101394341 A | 3/2009 |
| CN | 103188152 A | 7/2013 |
| CN | 103746915 A | 4/2014 |
| CN | 104468352 A | 3/2015 |
| CN | 106998285 A | 8/2017 |
| WO | 2010057192 A1 | 5/2010 |

OTHER PUBLICATIONS

Jiawei Zhang et al., "Trip Route Planning for Bicycle-Sharing Systems," IEEE 2nd International Conference on Collaboration and Internet Computing, 2016, 10 pages.

* cited by examiner

Routing table of a vR 1

| Destination routing node | Next-hop routing node | Route type |
|---|---|---|
| 2.2.2.2:8000 | 2.2.2.2:8000 | RTT |
| 3.3.3.3:8000 | 2.2.2.2:8000 | RTT |
| 4.4.4.4:8000 | 3.3.3.3:8000 | RTT |

Routing table of a vR 2

| Destination routing node | Next-hop routing node | Route type |
|---|---|---|
| 1.1.1.1:8000 | 1.1.1.1:8000 | RTT |
| 3.3.3.3:8000 | 1.1.1.1:8000 | RTT |
| 4.4.4.4:8000 | 1.1.1.1:8000 | RTT |

Routing table of a vR 3

| Destination routing node | Next-hop routing node | Route type |
|---|---|---|
| 1.1.1.1:8000 | 1.1.1.1:8000 | RTT |
| 2.2.2.2:8000 | 1.1.1.1:8000 | RTT |
| 4.4.4.4:8000 | 4.4.4.4:8000 | RTT |

FIG. 6

| Destination routing node | Next-hop routing node | Route type |
|---|---|---|
| 1.1.1.1:8001 | 1.1.1.1:8001 | Packet loss rate |
| 3.3.3.3:8001 | 1.1.1.1:8001 | Packet loss rate |
| 4.4.4.4:8001 | 1.1.1.1:8001 | Packet loss rate |

AF4

| Destination routing node | Next-hop routing node | Route type |
|---|---|---|
| 2.2.2.2:8000 | 2.2.2.2:8000 | RTT |
| 3.3.3.3:8000 | 2.2.2.2:8000 | RTT |
| 4.4.4.4:8000 | 3.3.3.3:8000 | RTT |

EF

| Destination routing node | Next-hop routing node | Route type |
|---|---|---|
| 2.2.2.2:8000 | 2.2.2.2:8000 | Costs |
| 3.3.3.3:8000 | 2.2.2.2:8000 | Costs |
| 4.4.4.4:8000 | 3.3.3.3:8000 | Costs |

| First routing node | Service POP |
|---|---|
| vR 1 | 11.11.11.11, 11.11.11.12, and 66.66.66.66 |
| vR 2 | 12.12.11.1, 12.12.11.2, and 12.12.11.3 |
| vR 3 | 22.22.22.3, 33.33.33.34, and 88.88.88.88 |
| ... | ... |
| vR 7 | 44.44.44.1, 77.77.77.77, and 99.99.99.99 |

FIG. 9

| IP packet header + UDP packet header | | | | |
|---|---|---|---|---|
| Version number | Length of a tunnel header | Lengths of all headers | TTL | Route type |
| Hash value | | | | |
| ToS | Type of an extension header | | Checksum of a header | |
| Original packet | | | | |

FIG. 10

ROUTING METHOD AND DEVICE

CROSS-REFERENCE TO RELATED APPLICATIONS

This application is a continuation of International Patent Application No. PCT/CN2018/076755 filed on Feb. 13, 2018, which is hereby incorporated by reference in its entirety.

TECHNICAL FIELD

This application relates to the field of network technologies, and in particular, to a routing method and a device.

BACKGROUND

In the field of network technologies, a conventional overlay network is a virtualization technology that implements overlaying on a network architecture. A general framework of the overlay network is as follows. In the overlay network, a basic network is not greatly modified, and an Internet Protocol (IP)-based basic network technology is mainly used to enable an application to be carried on a network and separated from another network service. A common implementation is to encapsulate a data packet into another data packet at a tunnel start point, and decapsulate the encapsulated packet after the encapsulated packet is forwarded to a tunnel end point. A physical network is transparent for a terminal system that is different from an overlay edge device and that is connected to the overlay network. That is, the terminal system does not need to know deployment of the physical network.

Referring to FIG. 1, an overlay network is logically divided into two planes: a control plane that is mainly responsible for establishment and maintenance of a virtual tunnel and notification of reachability information of a host, and a forwarding plane that is a physical network carrying an overlay packet. In FIG. 1, after a packet A sent by a source host reaches an edge device of the overlay network, the edge device performs tunnel encapsulation on the received packet A based on a tunnel encapsulation protocol and a destination host that needs to be reached by the packet, to obtain a tunnel-encapsulated packet, and then transmits the tunnel-encapsulated packet on the physical network until the tunnel-encapsulated packet reaches a destination edge device of the destination host. The destination edge device removes a tunnel header of the received packet to obtain an original packet A, and sends the original packet A to the destination host. That is, the packet A sent by a source host A is transmitted on the physical network and reaches a destination host B.

However, in a process of transmitting the packet on the overlay network in FIG. 1, that is, in a transmission process after the edge device encapsulates the received packet, quality of service (QoS) such as a latency, a jitter, or a packet loss rate, of a transmission path is not considered. A routing path is available provided that the routing path is considered by an IP layer to be reachable. However, in practice, a routing path considered by the IP layer to be reachable is insufficient to carry transmission of a packet.

SUMMARY

Embodiments of this application provide a routing method and a device, to provide a routing path satisfying a QoS requirement.

According to a first aspect, an embodiment of this application provides a routing method. The method includes the following steps. A first routing node performs QoS measurement on a path between the first routing node and a reachable adjacent routing node, to obtain a QoS parameter set of the path between every two adjacent routing nodes, where the first routing node is any routing node controlled by a control node, and the first routing node reports the QoS parameter set of the path between every two adjacent routing nodes to the control node. The control node calculates a routing path from each routing node to another routing node based on a QoS parameter set that is of a path between every two adjacent routing nodes and that is reported by each routing node, where the other routing node is a routing node that is in routing nodes controlled by the control node and that is different from each routing node. The control node sends, to each routing node, one or more routing tables of routing performed from each routing node to the other routing node. After receiving the packet, each routing node determines, from the received one or more routing tables, a routing table corresponding to an identifier of a received packet, and forwards the received packet based on the routing table, where the identifier of the received packet is used to indicate a QoS requirement of the packet.

In this embodiment of this application, the control node calculates a routing path based on a QoS parameter set dynamically measured by each routing node and can obtain routing paths that are of routing performed from each routing node to another routing node and that are based on different QoS parameters. In this way, routing tables of each routing node that are based on the different QoS parameters can be obtained. In this case, after receiving the packet, each routing node can determine, based on the routing table corresponding to the identifier of the received packet, a routing path used to forward the packet. To be specific, the determined routing path can satisfy the QoS requirement of the received packet and can carry transmission of the packet.

In this embodiment of this application, each routing node may report a QoS parameter set to the control node in real time, or may periodically report a QoS parameter set to the control node according to an actual requirement. For example, each routing node reports a QoS parameter set once every two seconds (s), every 4 s, or every 5 s. In addition, each routing node is a routing node controlled by the control node, and the first routing node is any one of routing nodes controlled by the control node.

In a possible design, each of the routing tables corresponds to a type of identifier of a packet. Therefore, it is ensured that each routing node can determine, from the routing tables, a routing table corresponding to an identifier of a received packet based on the identifier of the packet.

In a possible design, when calculating the routing path from each routing node to another routing node based on the QoS parameter set, the control node uses a value of each QoS parameter of the path between every two adjacent routing nodes as a weight value of the path, and substitutes weight values that are in the weight values and that correspond to a same QoS parameter into a Dijkstra's algorithm to obtain routing paths that are of different route types and that are from each routing node to the other routing node.

In this embodiment of this application, a parameter needs to be set for the path between every two adjacent routing nodes during calculation using the Dijkstra's shortest routing path algorithm. That is, a weight value is set for the path between every two adjacent routing nodes. The weight value may be a value of a QoS parameter, such as a latency, a packet loss rate, or a jitter, of the path between every two adjacent routing nodes. Alternatively, the weight value may be a combination of values of a plurality of QoS parameters, such as fitting of a latency and a packet loss rate, of the path between every two adjacent routing nodes. Alternatively, the weight value may be fitting of a value of a QoS parameter and costs of the path between every two adjacent routing nodes. In this case, routing paths that are based on different route types are obtained. The routing path may be a routing path based on a latency, a routing path based on a packet loss rate, a routing path based on a jitter, or a routing path based on a latency and a packet loss rate.

In this embodiment of this application, when each routing node reports a measured QoS parameter set to the control node in real time, the control node may calculate the routing path from each routing node to another routing node in real time. Alternatively, the control node may calculate the routing path from each routing node to another routing node according to a specific period. Alternatively, the control node may calculate the routing path from each routing node to another routing node when a difference between a value of at least one QoS parameter in the QoS parameter set and a previously reported value of the QoS parameter is greater than a preset threshold, to avoid route flapping.

When each routing node periodically reports a measured QoS parameter set to the control node, the control node may calculate the routing path from each routing node to another routing node according to a period that is the same as a reporting period of each routing node. Alternatively, the control node may calculate the routing path from each routing node to another routing node according to a period that is different from a reporting period.

In a possible design, the QoS parameter includes one or more of a latency, a packet loss rate, and a jitter, and when using the value of each QoS parameter of the path between every two adjacent routing nodes as the weight value of the path, the control node may use, as the weight value of the path, an estimated latency obtained by adding a product of a current latency of the path between every two adjacent routing nodes and a first weight to a product of a historical latency and a second weight, where a sum of the first weight and the second weight is 1, and the first weight is a constant or a ratio of a jitter to an average latency of the path between every two adjacent routing nodes, may use, as the weight value of the path, an average packet loss rate of the path between every two adjacent routing nodes, where each item used to calculate the average packet loss rate of the path between every two adjacent routing nodes is a product of a third weight and a packet loss rate that is obtained through each measurement, and the third weight is a sum of 1 and a ratio of a maximum quantity of continuously lost packets to a total quantity of sent data packets in each measurement process, may use, as the weight value of the path, transmission efficiency obtained by multiplying a length of the packet transmitted on the path between every two adjacent routing nodes by a transmission correctness percentage divided by transmission duration of the packet transmitted on the path between every two adjacent routing nodes, where the transmission duration is a sum of a half of an estimated latency of the path between every two adjacent routing nodes and a value obtained by dividing the length of the packet transmitted on the path between every two adjacent routing nodes by a bandwidth of the path between every two adjacent routing nodes, and the transmission correctness percentage is a difference obtained by subtracting an average packet loss rate of the path between every two adjacent routing nodes from 1, or may use, as the weight value of the path, a value obtained by adding a product of costs of the path between every two adjacent routing nodes and a fourth weight to a product of a value of any QoS parameter and a fifth weight, where a sum of the fourth weight and the fifth weight is 1, and the fourth weight is greater than or equal to 0 and less than or equal to 1.

In this embodiment of this application, before the value of each QoS parameter of the path between every two adjacent routing nodes is used as the weight value of the path, to more accurately reflect a QoS status of the path, corresponding processing is first performed on the value of the QoS parameter. For example, a current latency is processed in combination with the current latency, a historical latency, and a jitter of the path between every two adjacent routing nodes. When there is a consecutive increase in a measured latency, rapid convergence can be implemented. A burst increase in a measured latency can also be partially smoothed, and being smoothed herein means reducing impact of a burst latency. Alternatively, the average packet loss rate of path between every two adjacent routing nodes is used as the weight value of the path. When the average packet loss rate of the path between every two adjacent routing nodes is calculated, impact of a quantity of continuously lost packets in each period is considered. The quantity of continuously lost packets has a relatively large impact on some services such as real-time media services. For example, the quantity of continuously lost packets causes frame freezing to the real-time media services. In this case, when the quantity of continuously lost packets is taken into account in calculating the average packet loss rate of the path between every two adjacent routing nodes, the QoS status of the path can be measured more accurately. Alternatively, a combination of different QoS parameters is considered. For example, transmission efficiency that is calculated based on a latency and a packet loss rate is used as the weight value of the path. Alternatively, a value that is obtained by performing weighted averaging on costs and a value of any QoS parameter of the path between every two adjacent routing nodes is used as the weight value of the path.

In a possible design, when using, as the weight of the path, the average packet loss rate of the path between every two adjacent routing nodes, the control node may use, as the weight value of the path, a difference obtained by subtracting, from 1, a product of the transmission correctness percentage of the path between every two adjacent routing nodes and transmission correctness percentages of all paths passed through by the packet transmitted on the path between every two adjacent routing nodes before the packet reaches the path, and/or when using, as the weight value of the path, the transmission efficiency obtained by multiplying the length of the packet transmitted on the path between every two adjacent routing nodes by the transmission correctness percentage divided by the transmission duration of the packet transmitted on the path between every two adjacent routing nodes, the control node may use a reciprocal of the transmission efficiency as the weight value of the path.

In this embodiment of this application, the difference that is obtained by subtracting, from 1, the product of the transmission correctness percentage of the path between every two adjacent routing nodes and the transmission correctness percentages of all paths passed through by the packet transmitted on the path between every two adjacent routing nodes before the packet reaches the path may be used as the weight value of the path, to more accurately represent a packet loss rate of the path. Alternatively, the reciprocal of the transmission efficiency is used as the weight value of the path, to simplify complexity of calculation in which the weight value is substituted into the Dijkstra's algorithm.

In a possible design, when forwarding the received packet based on the routing table, the first routing node determines a destination routing node corresponding to a destination service point of presence (POP) of the received packet based on a correspondence that is between a service POP and a routing node and that is delivered by the control node, the first routing node determines, from the routing table, a second routing node through which the destination routing node can be reached, and the first routing node forwards the received packet to the second routing node.

In this embodiment of this application, the first routing node further receives the correspondence that is between a service POP and a routing node and that is delivered by the control node, to determine the destination routing node corresponding to the destination service POP of the received packet and further to determine the second routing node through which the destination routing node can be reached.

In a possible design, when forwarding the received packet to the second routing node, the first routing node performs tunnel encapsulation on the received packet based on the second routing node, to obtain a tunnel-encapsulated packet, where the tunnel-encapsulated packet carries a route type such that the second routing node can determine, based on the route type, a routing table that satisfies the QoS requirement of the packet, and the first routing node forwards the tunnel-encapsulated packet to the second routing node.

In this embodiment of this application, the route type carried in the tunnel-encapsulated packet may be a QoS parameter such as a latency or a packet loss rate, or QoS parameters such as a combination of a latency and a packet loss rate, or may be costs.

In this embodiment of this application, the tunnel-encapsulated packet carries the route type. In this case, after receiving the packet, the second routing node may directly determine, based on the route type, a routing table of a routing path used to forward the packet. The packet does not need to be further parsed to obtain an identifier of the packet, and a further process of searching for a correspondence between a routing table and an identifier of the packet is not required, either. Therefore, a forwarding latency of the packet is reduced.

In this embodiment of this application, in addition to carrying a field of a route type, the tunnel-encapsulated packet may further include another field such as Version: a version number, PhLen: a length of a tunnel header, All Ph Len: lengths of all headers, time to live (TTL): used to indicate a specific routing node at which a packet is lost, HashKey: a hash value, type of service (ToS): used to indicate a feature of a packet, Nheader: a type of an extension header, or Ph CheckSum: a checksum of a header. Reliability of forwarding the packet can be improved by adding these fields. For example, HashKey is used to perform a hash on a packet to obtain a hash value. The hash value may be invoked for use during load sharing, and TTL may be used to avoid a packet loop.

In a possible design, the identifier of the packet is any one of a 5-tuple, a differentiated services code point DSCP, or a ToS.

In this embodiment of this application, the identifier of the packet may have different forms, and the foregoing several forms are merely examples. A form of the identifier of the packet is not limited in this embodiment of this application. When the identifier of the packet is a 5-tuple, it may be required to restrict a port range of an upper-layer user, to improve resource utilization and table lookup performance of each routing node. Upper-layer users having a port within a specified range use a same 5-tuple, to reduce information stored in each routing node.

According to a second aspect, an embodiment of this application provides a first routing node. The first routing node has a function of implementing behavior of the first routing node or one of the routing nodes in the method in the first aspect. The function may be implemented by hardware, or may be implemented by hardware executing corresponding software. The hardware or the software includes one or more modules corresponding to the foregoing function.

In a possible design, a specific structure of the first routing node may include a measuring module, a reporting module, a delivering module, and a forwarding module. The modules included in the first routing node may perform corresponding functions in the method provided in the first aspect or any possible design of the first aspect.

According to a third aspect, an embodiment of this application provides a control node. The control node has a function of implementing behavior of the control node in the method in the first aspect. The function may be implemented by hardware, or may be implemented by hardware executing corresponding software. The hardware or the software includes one or more modules corresponding to the foregoing function.

In a possible design, a specific structure of the control node may include a receiving module, a calculating module, and a delivering module. The modules included in the control node may perform corresponding functions in the method provided in the first aspect or any possible design of the first aspect.

According to a fourth aspect, an embodiment of this application provides a first routing node. The first routing node includes a memory configured to store computer executable program code, a communications interface, and a processor, where the processor is coupled to the memory and the communications interface. The program code stored in the memory includes an instruction. When the processor executes the instruction, the instruction enables the first routing node to perform the method performed by the first routing node or by one of the routing nodes in the first aspect or any possible design of the first aspect.

According to a fifth aspect, an embodiment of this application provides a control node. The control node includes a memory configured to store computer executable program code, a communications interface, and a processor, where the processor is coupled to the memory and the communications interface. The program code stored in the memory includes an instruction. When the processor executes the instruction, the instruction enables the control node to perform the method performed by the control node in the first aspect or any possible design of the first aspect.

According to a sixth aspect, an embodiment of this application provides a computer storage medium that stores an instruction, and when the instruction is run on a computer, the computer is enabled to perform the method in the first aspect or any possible design of the first aspect.

According to a seventh aspect, an embodiment of this application provides a computer program product that includes an instruction, and when the instruction is run on a computer, the computer is enabled to perform the method in the first aspect or any possible design of the first aspect.

According to an eighth aspect, an embodiment of this application provides a chip system. The chip system includes a processor configured to support a first routing node or one of routing nodes, and a control node in implementing the method in the first aspect, for example, generating or processing data and/or information in the method in the first aspect. In a possible design, the chip system further includes a memory, where the memory is configured to store a program instruction and data that are necessary for the first routing node or the one of routing nodes, and the control node. The processor in the chip system may invoke the program instruction and the data that are stored in the memory in the chip system such that the chip system can implement functions that can be implemented by the first routing node or the one of routing nodes, and the control node. The chip system may include a chip, or may include a chip and another discrete device.

BRIEF DESCRIPTION OF DRAWINGS

FIG. 6 is a latency-based routing table of each routing node according to an embodiment of this application;

FIG. 8B is a schematic diagram of a correspondence between a routing table and a DSCP according to an embodiment of this application;

FIG. 9 is a schematic diagram of a correspondence between a service POP and a routing node according to an embodiment of this application;

FIG. 10 is a schematic diagram of a format of a tunnel encapsulation protocol according to an embodiment of this application;

DESCRIPTION OF EMBODIMENTS

To make the objectives, technical solutions, and advantages of this application clearer, the following further describes the embodiments of this application in detail with reference to the accompanying drawings.

The following describes some terms in the embodiments of this application to facilitate understanding of a person skilled in the art.

Figure 1:
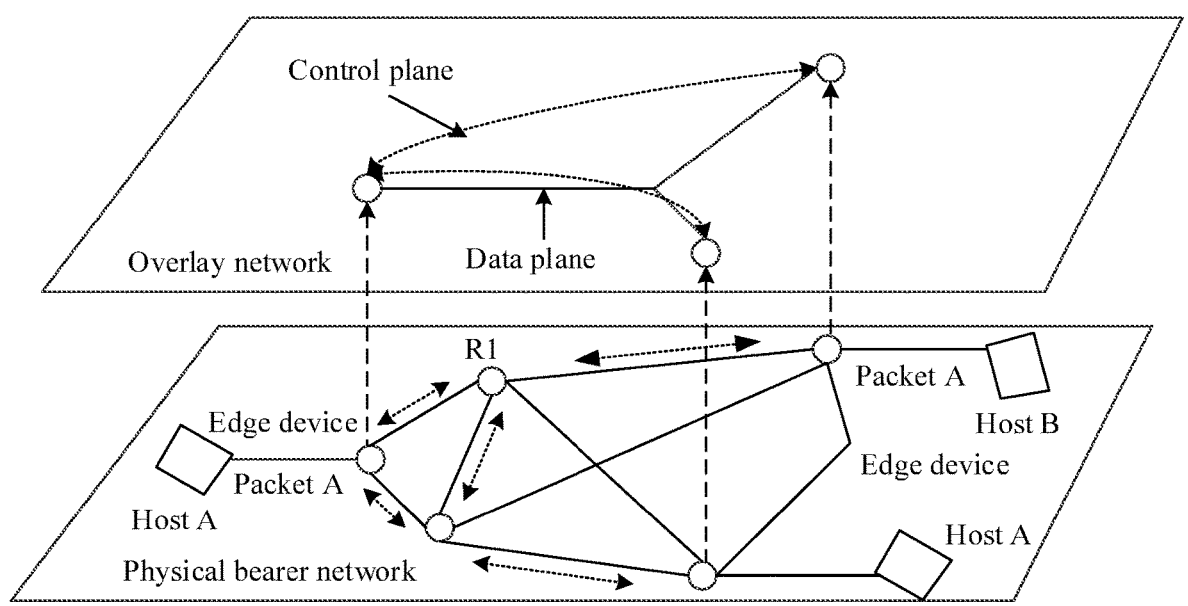
FIG. 1 is a schematic architectural diagram of an overlay network.
Figure 2:
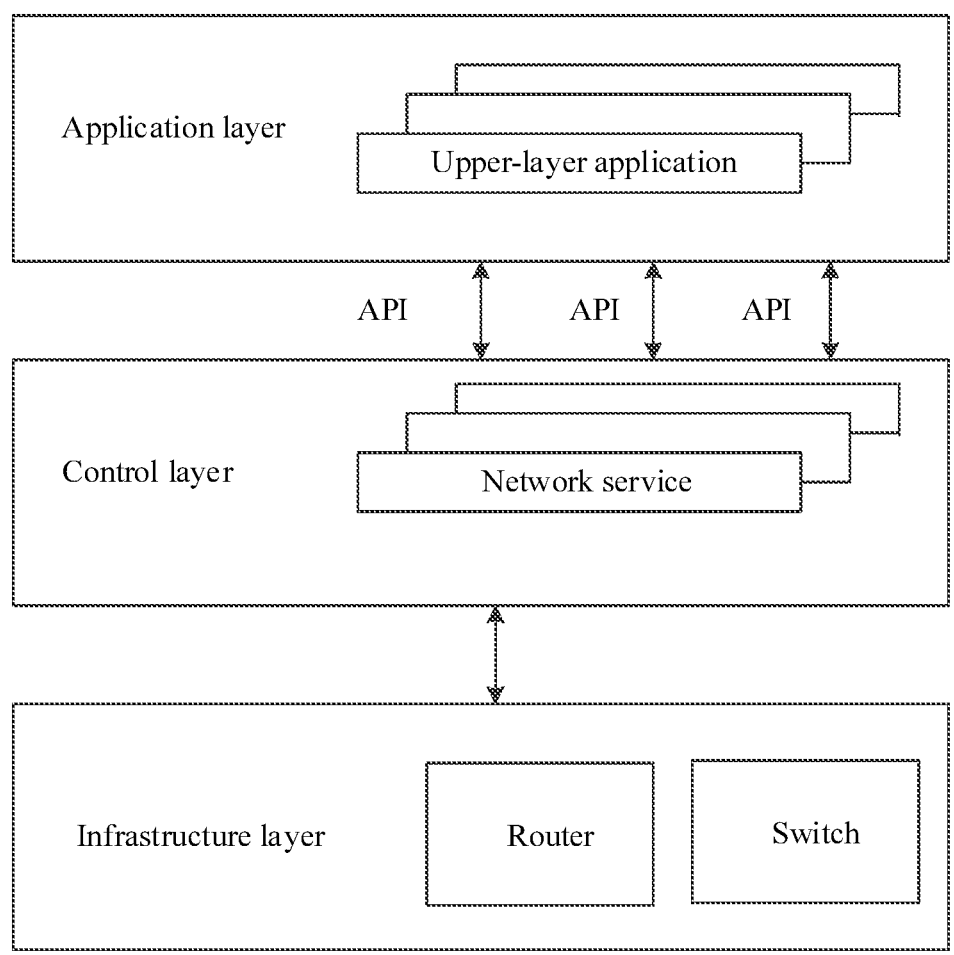
FIG. 2 is a schematic diagram of a hierarchy of software-defined networking (SDN)

1. SDN: As shown in FIG. 2, a typical architecture of SDN is divided into three layers in total. A top layer is an application layer, including various applications, network simulation, network planning, and the like. A middle layer is a control layer, and is mainly responsible for orchestrating resources on a data plane, maintaining a network topology and state information, and the like. A bottom layer is a network device layer (infrastructure layer), and is mainly responsible for data processing, data forwarding, and state collection based on a flow table. The application layer invokes an application programming interface (API) connected to the control layer based on different application requirements, to implement application programs of different functions. The control layer performs centralized control on network devices, such as routers and switches, in the network device layer.

2. Overlay network: Routing nodes on the overlay network performs communication with each other using a virtual or logical connection, and each virtual or logical connection corresponds to a path of a physical network. The overlay network can satisfy different network requirements of different tenants, and the different tenants share infrastructure such as a server, a storage, or a network. However, virtual networks obtained by tenants are independent of each other and fully isolated from each other. The tenants may randomly configure and manage their own virtual networks using a control plane provided by a cloud service provider.

3. Dijkstra's algorithm: The algorithm is an algorithm for finding a shortest path from one vertex to each of other vertexes. A main characteristic of the algorithm is as follows. Extension is performed from a start point to an end point, where the start point is used as a center.

In this embodiment of this application, each routing node performs QoS measurement on a path between each routing node and a reachable adjacent routing node, and reports, to a control node, a QoS parameter set obtained by measuring the path between every two adjacent routing nodes. The control node calculates a routing path based on a QoS parameter set dynamically measured by each routing node and can obtain routing paths that are from each routing node to another routing node and that are based on different QoS parameters. In this way, routing tables of each routing node that are based on the different QoS parameters can be obtained. In this case, after receiving a packet, each routing node can determine, based on a routing table corresponding to an identifier of the received packet, a routing path used to forward the packet. To be specific, the determined routing path can satisfy a QoS requirement of the received packet and can carry transmission of the packet.

Figure 3:
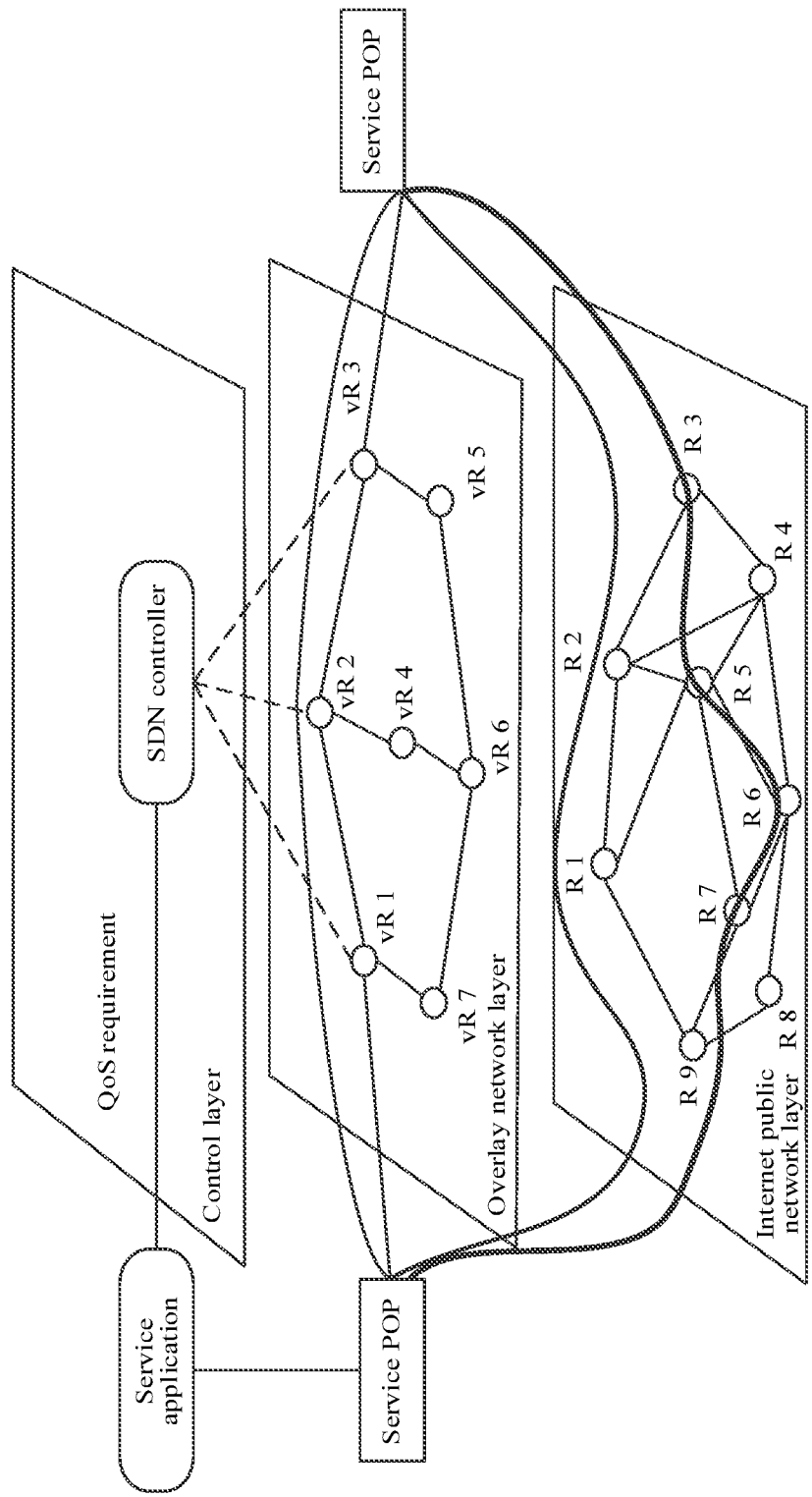
FIG. 3 is a schematic diagram of a hierarchy of an SDN-based overlay network according to an embodiment of this application.

FIG. 3 is an application scenario according to an embodiment of this application. In FIG. 3, a network architecture is provided, and includes an SDN controller, a virtual routing node (or virtual router (vRouter)), and a physical routing node. In FIG. 3, the vRouter is denoted as vR, and the physical routing node is briefly denoted as R. Communication between the SDN controller and each vRouter may be performed using a Transmission Control Protocol (TCP)/an IP, or an OPENFLOW protocol, or another pre-specified communications protocol. Communication between vRouters and communication between a vRouter and a physical routing node may also be performed using the TCP/IP protocol. For example, when a vRouter needs to map a to-be-sent data packet to a physical routing node for transmission, the vRouter sends, using the TCP/IP protocol, the data packet to the physical routing node to which the data packet is mapped. Communication between physical routing nodes may be performed using a routing protocol such as Open Shortest Path First (OSPF), a Routing Information Protocol (RIP), a Border Gateway Protocol (BGP), or another routing protocol. The network architecture in FIG. 3 further includes a service POP. The service POP may send a packet to a vRouter, or may interact with the SDN controller using an application server or an application process.

Still referring to FIG. 3, the network architecture may be logically divided into three layers. A first layer is a control layer, including an SDN controller. A second layer is an overlay layer, including a plurality of vRouters. A third layer is an Internet public network layer, including a plurality of physical routing nodes. Herein, the first layer is described as the "control layer", the second layer is described as the "overlay layer", and the third layer is described as the "Internet public network layer", which do not constitute a limitation. A person of ordinary skill in the art may replace, based on the function implemented by the layer, a name of each layer with another name corresponding to a function of the layer.

The routing methods and the devices provided in the embodiments of this application are deployed in the control layer and the overlay layer. It should be noted that the control layer, the overlay layer, and the Internet public network layer are not necessarily physically separated. That is, the control layer and the overlay layer may be disposed on a specific physical routing node at the Internet public network layer, and no dedicated hardware control device is required. Alternatively, the control layer and the overlay layer may be a server independent of a physical routing node that is on the Internet public network and that is responsible for packet forwarding, or may be installed on a server in a form of software, or even may be installed on a virtual machine of a server in a form of software. When the overlay layer is a server independent of a physical routing node that is on the Internet public network and that is responsible for packet forwarding, the server is a vRouter in the overlay layer. It should be noted that each vRouter corresponds to at least one physical routing node on an Internet public network. To be specific, one vRouter corresponds to one physical routing node or a plurality of physical routing nodes on the Internet public network. Herein, "corresponds" means that a vRouter is set according to a physical routing node on the Internet public network, and a routing path between any two vRouters is mapped to a routing path formed by physical routing nodes on the Internet public network.

The following describes the technical solutions in the embodiments of this application in detail with reference to the accompanying drawings and specific embodiments in the specification. In the following description process, an example in which the technical solutions in the embodiments of this application are applied to a scenario in FIG. 3, and a control node is an SDN controller is used.

Figure 4:
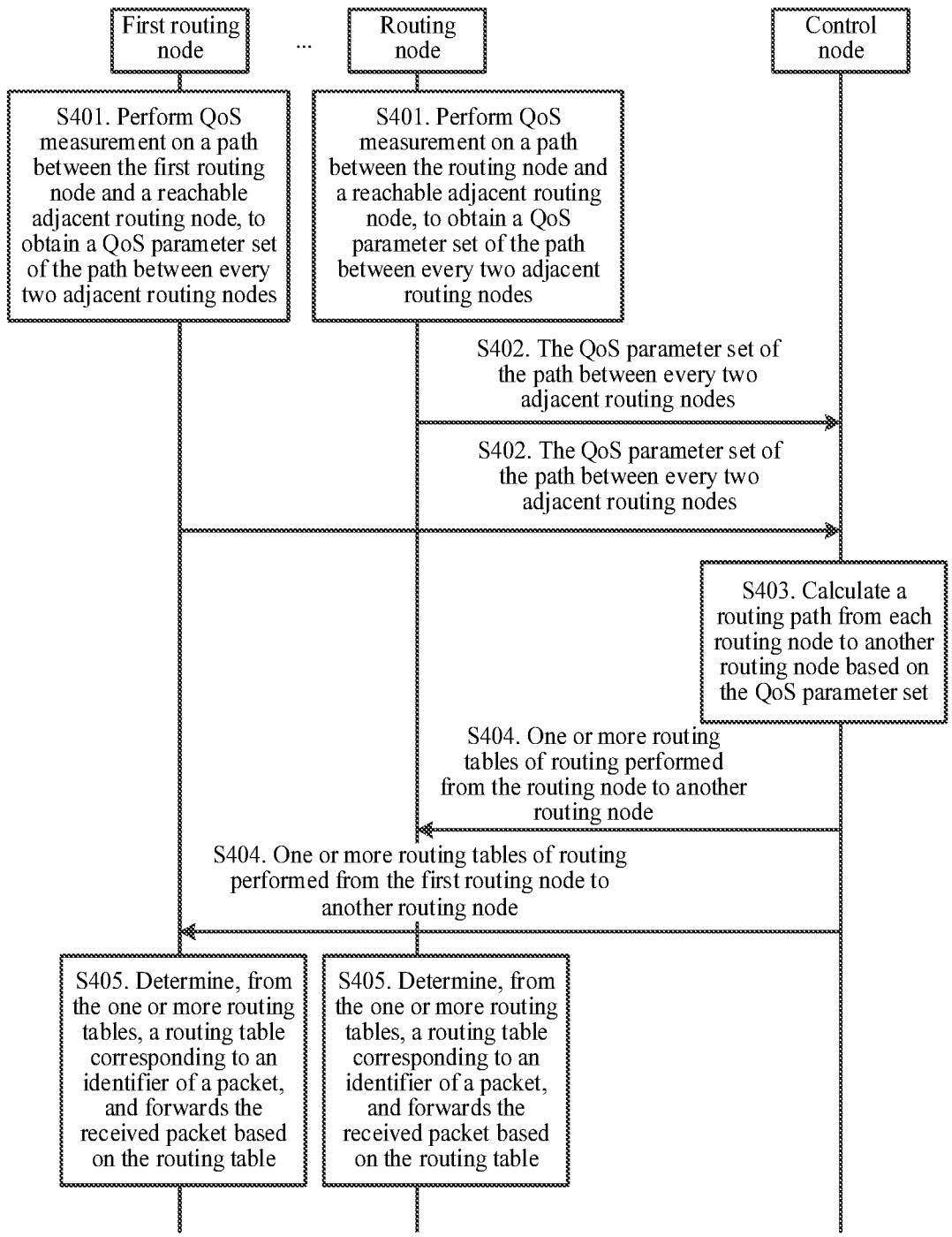
FIG. 4 is a schematic flowchart of a routing method based on QoS according to an embodiment of this application.

Based on the network architecture in FIG. 3, referring to FIG. 4, an embodiment of this application provides a routing method based on QoS. A procedure of the method is described as follows.

S401. A first routing node performs QoS measurement on a path between the first routing node and a reachable adjacent routing node, to obtain a QoS parameter set of the path between every two adjacent routing nodes, where the first routing node is any routing node controlled by an SDN controller. In the following description, an example in which the first routing node is a vR 1 in FIG. 3 is used. Certainly, the first routing node may alternatively be any one of routing nodes vR 1 to vR 7 except the vR 1 in FIG. 3.

The reachable adjacent routing node of the first routing node is a routing node that can be reached, through one hop, by a data packet sent by the first routing node. The path between every two adjacent routing nodes is a path between the first routing node and a reachable adjacent routing node of the first routing node. For example, referring to FIG. 3, routing nodes controlled by the SDN controller are the vR 1 to the vR 7. In the vR 1 to the vR 7, reachable adjacent routing nodes of the vR 1 are the vR 2 and the vR 7. The first routing node performs QoS measurement on the path between the first routing node and the reachable adjacent routing node, to obtain the QoS parameter set of the path between every two adjacent routing nodes. For example, the vR 1 performs QoS measurement on a path from the vR 1 to the vR 2 to obtain a QoS parameter of the path from the vR 1 to the vR 2. The vR 1 performs QoS measurement on a path from the vR 1 to the vR 7 to obtain a QoS parameter of the path from the vR 1 to the vR 7. The QoS parameter of the path from the vR 1 to the vR 2 and the QoS parameter of the path from the vR 1 to the vR 7 constitute a QoS parameter set.

In this embodiment of this application, the first routing node performs QoS measurement on the path from the first routing node to the reachable adjacent routing node, and another routing node that is controlled by the SDN controller and that is different from the first routing node, for example, another routing node in the vR 1 to the vR 7 except the vR 1, can also perform QoS measurement.

In this embodiment of this application, parameters on which QoS measurement is performed include any one or a combination of a plurality of the following a latency, a jitter, a packet loss rate, disorder, and the like. For example, the vR 1 performs QoS measurement on the path from the vR 1 to the vR 2. The latency refers to a period from a time at which the vR 1 sends a data packet to a time at which the vR 2 receives the data packet. The jitter refers to an absolute value of a difference between a first latency of receiving one packet by the vR 2 and a second latency of receiving the other packet by the vR 2 when two consecutive packets are sent by the vR 1. The packet loss rate refers to a quantity of lost data packets in a transmission process, and may be represented by a packet loss percentage or may be represented by a quantity of lost packets. The disorder refers to that a sequence in which the vR 2 receives data packets is different from a sequence in which the vR 1 sends the data packets. Therefore, QoS parameters of the path between every two adjacent routing nodes include any one or a combination of a plurality of the following: a latency, a jitter, a packet loss rate, disorder, and the like.

When performing QoS measurement, the first routing node may use a manner of active measurement, passive measurement, or a combination of passive measurement and active measurement in other approaches. In the following, the vR 1 is used as an example to describe in detail a process in which the vR 1 performs QoS measurement on the path from the vR 1 to the vR 2 in the manner of active measurement.

In a specific implementation process, the vR 1 sends a test data packet to the vR 2. The vR 1 receives related information fed back by the vR 2, for example, a time at which the vR 2 receives the test data packet sent by the vR 1 and a quantity of test data packets sent by the vR 1. Then the vR 1 may calculate a value of a parameter of the path from the vR 1 to the vR 2, such as a latency, a jitter, a packet loss rate, or disorder, based on related information when the vR 1 sends the test data packet, for example, a time at which the test data packet is sent and a total quantity of sent test data packets. It should be noted herein that the test data packet sent by the vR 1 to the vR 2 is actually carried on a physical routing node on the Internet public network for transmission. For example, the test data packet sent by the vR 1 are mapped and forwarded from physical routing nodes R 9 to R 1 to R 2 on the Internet public network. However, in an actual QoS measurement process, the vR 1 does not measure a QoS parameter of paths from the R 9 to the R 1 and from the R 1 to the R 2 when the test data packet is transmitted on the paths from the R 9 to the R1 and from the R 1 to the R 2. Instead, the vR 1 measures a QoS parameter of the path from the vR 1 to the vR 2 when the test data packet is transmitted from the vR 1 to the vR 2.

It should be noted herein that when the vR 1 performs QoS measurement on the path from the vR 1 to the vR 2, the vR 2 also performs QoS measurement on a path from the vR 2 to the vR 1. That is, the QoS measurement in this embodiment of this application is bidirectional measurement. When the bidirectional measurement is used for QoS measurement, each of results of the bidirectional measurement may be used by the SDN controller. For example, a result obtained by the vR 1 through measurement is used for the path from the vR 1 to the vR 2, and a result obtained by the vR 2 through measurement is used for the path from the vR 2 to the vR 1. Alternatively, a unidirectional measurement parameter is obtained through estimation based on results of the bidirectional measurement, and then the parameter of the unidirectional measurement is used for route calculation. The unidirectional measurement means that the vR 1 performs QoS measurement on the path from the vR 1 to the vR 2, or the vR 2 performs QoS measurement on the path from the vR 2 to the vR 1.

For example, a latency and a packet loss rate are measured. A unit of the latency is milliseconds (ms), and a unit of the packet loss rate is a percentage. Then, <vR 1, vR 2>={1, 0.01}. That is, after measuring a latency and a packet loss rate of the path from the vR 1 to the vR 2, the vR 1 obtains QoS parameters {1, 0.01}. Similarly, after QoS measurement performed by the other routing node different from the vR 1, obtained QoS parameters may be represented as: <vR 1, vR 7>={2, 0.03}, <vR 2, vR 3>={1, 0.1}, <vR 2, vR 4>={3, 0.01}, <vR 2, vR 1>={1, 0.01}, <vR 3, vR 5>={5, 0.01}, <vR 3, vR 2>={1, 0.001}, <vR 4, vR 6>={2, 0.01}, <vR 5, vR 6>={2, 0}, <vR 5, vR 3>={5, 0.01}, <vR 6, vR 4>={1, 0}, <vR 6, vR 7>={0, 0.01}, or <vR 6, vR 5>={2, 0}.

It should be noted herein that during measurement of a packet loss rate, in addition to recording a packet loss rate, QoS parameters may also include a parameter related to a packet loss rate, for example, a maximum quantity of continuously lost packets in each measurement period.

S402. The first routing node reports the QoS parameter set of the path between every two adjacent routing nodes to the SDN controller, and the SDN controller receives a QoS parameter set reported by each routing node.

It should be noted herein that routing nodes may be a plurality of routing nodes that are controlled by the SDN controller and that include the first routing node. For example, the routing nodes controlled by the SDN controller in the foregoing example are the vR 1 to the vR 7, and the first routing node may be any routing node in the vR 1 to the vR 7. That is, the SDN controller receives the QoS parameter set that is of the path between every two adjacent routing nodes and that is reported by each routing node in the vR 1 to the vR 7.

In this embodiment of this application, each routing node may report a QoS parameter set to the SDN controller in real time, or may periodically report a QoS parameter set to the SDN controller according to an actual requirement. For example, each routing node reports the QoS parameter set once every 2 s, every 4 s, or every 5 s.

S403. The SDN controller calculates a routing path from each routing node to another routing node based on the QoS parameter set, where the other routing node is a routing node that is in routing nodes controlled by the SDN controller and that is different from each routing node.

In this embodiment of this application, when the other routing node is an adjacent routing node of each routing node, the routing path from each routing node to another routing node may be a path between the routing node and the adjacent routing node. When the other routing node is a non-adjacent routing node of each routing node, the routing path from each routing node to another routing node may include all paths through which the other routing node is reached after a plurality of hops from each routing node.

In a specific implementation process, the SDN controller uses a value of each QoS parameter of the path between every two adjacent routing nodes as a weight value of the path.

In this embodiment of this application, a value of one QoS parameter may be used as the weight value of the path. For example, a latency, a packet loss rate, or a jitter is used as the weight value of the path. Alternatively, a combination of values of a plurality of QoS parameters may be used as the weight value of the path. For example, fitting of a latency and a packet loss rate is used as the weight value of the path. Alternatively, fitting of costs and a value of one QoS parameter may be used as the weight value of the path. In the following description, for example, a latency is used as a weight value of a path. Further, referring to FIG. 5, a latency 1 of the path from the vR 1 to the vR 2 is used as a weight value of the path. A latency 1 of the path from the vR 2 to the vR 3 is used as a weight value of the path. A latency 3 of the path from the vR 2 to the vR 4 is used as a weight value of the path. A latency 5 of the path from the vR 3 to the vR 5 is used as a weight value of the path. A latency 1 of the path from the vR 4 to the vR 6 is used as a weight value of the path. A latency 2 of the path from the vR 5 to the vR 6 is used as a weight value of the path. A latency 0 of the path from the vR 6 to the vR 7 is used as a weight value of the path. A latency 2 of the path from the vR 1 to the vR 7 is used as a weight value of the path.

Then, the SDN controller substitutes weight values that are in the weight values and that correspond to a same QoS parameter into a Dijkstra's algorithm, to obtain, through calculation, routing paths that are of different route types and that are from each routing node to another routing node. Herein, the different route types may be based on a QoS parameter such as a latency or a packet loss rate, or QoS parameters such as a combination of a latency and a packet loss rate, or may be costs. The foregoing example is still used. In this case, a latency of the path between every two adjacent routing nodes is substituted into the Dijkstra's algorithm, to obtain a latency-based routing path from each routing node to another routing node. For example, the SDN controller calculates a latency-based routing path from the first routing node to another routing node. To be specific, the SDN controller calculates a latency-based routing path from the vR 1 to each of the routing nodes {vR 2, vR 3, vR 4, vR 5, vR 6, vR 7}. An example in which the other routing node is the vR 5 is used. First, the vR 1 is centered, and reachable adjacent routing nodes of the vR 1 are the vR 2 and the vR 7. A latency of the path from the vR 1 to the vR 2 is 1, and a latency of the path from the vR 1 to the vR 7 is 2. Because the latency of the path from the vR 1 to the vR 7 is greater than the latency of the path from the vR 1 to the vR 2, the vR 2 is used as a next-hop routing node of routing performed from the vR 1 to the vR 5. Then, the vR 2 is centered, and reachable adjacent routing nodes of the vR 2 are the vR 3 and the vR 4. A latency of the path from the vR 2 to the vR 3 is 1, and a latency of the path from the vR 2 to the vR 4 is 3. Because the latency of the path from the vR 2 to the vR 4 is greater than the latency of the path from the vR 2 to the vR 3, the vR 3 is used as a next-hop routing node of routing performed from the vR 2 to the vR 5. Next, the vR 3 is centered, and a reachable adjacent routing node of the vR 3 is the vR 5. A latency of the path from the vR 3 to the vR 5 is 5, less than a latency that is of a path from the vR 2 to the vR 4 to the vR 6 to the vR 5 and that is 6. Therefore, it is determined that a routing path from the vR 1 to the vR 5 is a path from the vR 1 to the vR 2 to the vR 3 to the vR 5 and a latency of the routing path is 7.

Based on a same calculation process, the SDN controller may calculate a routing path from the vR 1 to each of the vR 2, the vR 3, the vR 4, the vR 6, and the vR 7, and a latency-based routing path of another routing node that is in the routing nodes and that is different from the first routing node, for example, a routing path from the vR 2 to each of the vR 1, the vR 3, the vR 4, the vR 5, the vR 6, and the vR 7, a routing path from the vR 3 to each of the vR 1, the vR 2, the vR 4, the vR 5, the vR 6, and the vR 7, . . . , and a routing path from the vR 7 to each of the vR 1, the vR 2, the vR 3, the vR 4, the vR 5, and the vR 6. In this case, a next-hop routing node of routing performed from the first routing node to another routing node can be obtained based on the calculated routing path from the first routing node to another routing node. Then, a routing table of the first routing node is further obtained. In a specific implementation process, because a latency of the path between every two adjacent routing nodes is used as the weight value of the path in the foregoing example, an obtained routing table of each routing node is based on a latency. Further, FIG. 6 shows a routing table about a next-hop routing node of routing performed from the vR 1 to another routing node, a routing table about a next-hop routing node of routing performed from the vR 2 to another routing node, and a routing table about a next-hop routing node of routing performed from the vR 3 to another routing node. In FIG. 6, each routing table includes three items. A first item is an IP address and a port number of a destination routing node, namely, another routing node of routing performed from each routing node. A second item is an IP address and a port number of a next-hop routing node of routing performed from each routing node to another routing node. A third item is a route type, such as a latency that is used as an example in FIG. 6.

Similarly, a packet loss rate of the path between every two adjacent routing nodes may also be used as the weight value of the path, to calculate a routing path that is from each routing node to another routing node and that is based on a packet loss rate. Alternatively, fitting of a latency and a packet loss rate of the path between every two adjacent routing nodes is used as the weight value of the path, to calculate a routing path that is from each routing node to another routing node and that is based on a latency and a packet loss rate. Alternatively, costs of the path between every two adjacent routing nodes are used as the weight value of the path, to calculate a routing path that is from each routing node to another routing node and that is based on costs. Then, routing tables that are based on a packet loss rate, based on a latency and a packet loss rate, and based on costs are obtained. A specific implementation process of calculating the routing path is the same as that of calculating a latency-based routing table of each routing node. Details are not described herein again.

In this embodiment of this application, the SDN controller smoothes each QoS parameter before using the value of each QoS parameter of the path between every two adjacent routing nodes as the weight value of the path, to more accurately represent a QoS status of the path between every two adjacent routing nodes. Descriptions are separately provided in the following parts.

Part 1. Latency:

The SDN controller uses, as the weight value of the path, an estimated latency obtained by adding a product of a current latency of the path between every two adjacent routing nodes and a first weight to a product of a historical latency and a second weight. In the following description, an example in which a latency that is of a path between the first routing node and a reachable adjacent routing node and that is reported by the first routing node is used. It is assumed that the first routing node reports a latency of the path to the SDN controller according to a specific period. A current latency of the path is denoted as $RTT_i$, indicating a latency reported by the first routing node in the $i^{th}$ period. A historical latency of the path is denoted as $RTT_i$, indicating a latency reported by the first routing node in the $(i-1)^{th}$ period. A first weight of the current latency is denoted as a, and a second weight of the historical latency may be denoted as $1-\alpha$. An estimated latency of the path is denoted as RTT, and then RTT may be represented by a formula (1):

$$RTT = (1-\alpha)*RTT_{(i-1)} + \alpha*RTT_i. \quad (1)$$

Herein, α may be a constant value, or may be a ratio of a jitter of the path to an average latency. When α is a constant value, α is greater than 0 and less than 1. By performing the foregoing processing on $RTT_i$, impact of burstiness of the latency in the $i^{th}$ period on a latency of the path can be reduced.

When α is a ratio of a jitter of the path to an average latency, if the jitter of the path is denoted as Jitter, and the average latency is denoted as Average (RTT), $$\alpha = \frac{\text{Jitter}}{\text{Averge }(RTT)}.$$

Then, α is substituted into the formula (1), another expression of RTT may be obtained, and is shown as a formula (2):

$$RTT = \left(1 - \frac{\text{Jitter}}{\text{Averge }(RTT)}\right)*RTT_{(i-1)} + \frac{\text{Jitter}}{\text{Averge }(RTT)}*RTT_i. \quad (2)$$

A process in which the SDN controller processes a latency of another path between every two adjacent routing nodes is the same as a process in which the SDN controller processes a latency of the path between the first routing node and the reachable adjacent routing node. Details are not described herein again.

Figure 5:
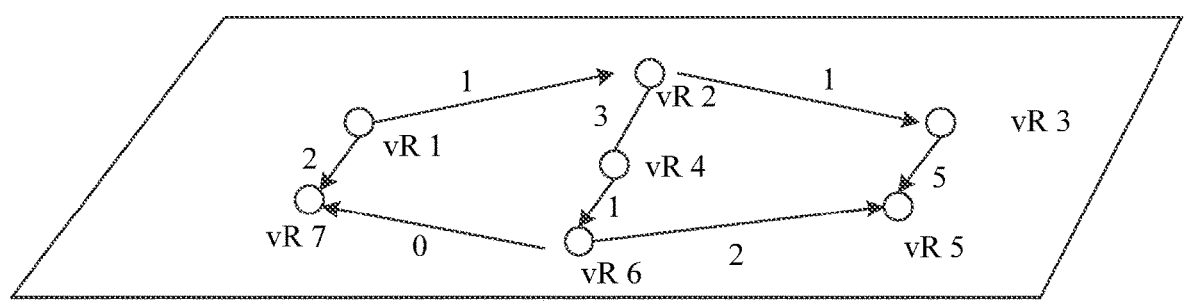
FIG. 5 is a path to which a weight value is assigned and that is between every two adjacent routing nodes according to an embodiment of this application.

In this embodiment of this application, a current latency is processed in combination with the current latency, a historical latency, and a jitter of the path between every two adjacent routing nodes. When there is a consecutive increase in a current latency measured in each period, rapid convergence can be implemented. A burst increase in a current latency can also be partially smoothed, and being smoothed herein means reducing impact of a burst latency. In a specific implementation process, an example in which the path from the vR 1 to the vR 2 in FIG. 5 is used. A current latency of 1 ms, a historical latency of 0.5 ms, a jitter of 0.5 ms, and an average latency of 0.75 ms of the path from the vR 1 to the vR 2 are substituted into the formula (2), and then an estimated latency of the path can be calculated as ⅚ ms. In this case, the estimated latency of ⅚ ms is used as a weight value of the path. Correspondingly, a routing path from the first routing node to another routing node is calculated based on an estimated latency of the path between every two adjacent routing nodes.

Part 2. Packet Loss Rate:

The SDN controller uses, as the weight value of the path, an average packet loss rate of the path between every two adjacent routing nodes. In the following description, an example in which a packet loss rate and a maximum quantity of continuously lost packets of a path that is between the first routing node and a reachable adjacent routing node and that is reported by the first routing node is used. It is assumed that the first routing node reports a packet loss rate and a maximum quantity of continuously lost packets to the SDN controller according to a specific period, and there is a total of N periods for reporting. A ratio of a maximum quantity of continuously lost packets in the $n^{th}$ period to a total quantity of data packets sent in the $n^{th}$ period is denoted as $p_n$, and n=1, 2, . . . . N. A packet loss rate measured in the $n^{th}$ period is denoted as $LostRate_n$. An actual packet loss rate of the path in the $n^{th}$ period is denoted as $L_n$, and $L_n$ may be represented by formula (3):

$$L_n = (1+p_n)*LostRate_n. \tag{3}$$

If the average packet loss rate of the path between every two adjacent routing nodes is denoted as LostRate, there are two calculation manners of LostRate. Descriptions are separately provided below.

Calculation Manner 1:

An average value of actual packet loss rates in the previous N periods is used as the weight value of the path. Then, LostRate may be represented by a formula (4):

$$LostRate = \frac{1}{N}(L_N + L_{N-1} + \ldots + L_1). \tag{4}$$

Calculation Manner 2:

A value that is obtained by performing weighted averaging on actual packet loss rates in the previous N periods and an actual packet loss rate in a current period is used as the weight value of the path. Then, LostRate may be represented by a formula (5):

$$LostRate = \frac{1}{2}*L_N + \frac{1}{4}*L_{N-1} + \ldots + \frac{1}{2^N}*L_1 + \frac{1}{2^N}*L_1. \tag{5}$$

In this embodiment of this application, a process in which the SDN controller processes a packet loss rate of another path between every two adjacent routing nodes is the same as a process in which the SDN controller processes a packet loss rate of the path between the first routing node and the reachable adjacent routing node. Details are not described herein again.

In this embodiment of this application, when the average packet loss rate of the path between every two adjacent routing nodes is calculated, impact of a maximum quantity of continuously lost packets in each period is considered. The maximum quantity of continuously lost packets has a relatively large impact on some services (such as real-time media services). For example, the maximum quantity of continuously lost packets causes frame freezing to the real-time media services. In this case, when a maximum quantity of continuously lost packets is taken into account in calculating the average packet loss rate of the path between every two adjacent routing nodes, a packet loss rate status of the path can be measured more accurately, ensuring that a calculated routing path based on a packet loss rate can carry transmission of the packet.

To further represent the packet loss rate of the path between every two adjacent routing nodes more clearly, a difference that is obtained by subtracting, from 1, a product of a transmission correctness percentage of the path between every two adjacent routing nodes and transmission correctness percentages of all paths passed through by a packet transmitted on the path between every two adjacent routing nodes before the packet reaches the path can be used as the weight value of the path. The packet loss rate of the path between every two adjacent routing nodes may be represented by a formula (6):

$$LostRate_{path} = 1 - \Pi_{i \in path}(1 - LostRate_i). \tag{6}$$

Herein, path indicates paths passed through by a packet in a forwarding process, and i indicates one of the paths. For example, the first routing node vR 1 receives a packet sent by a source POP, and then needs to forward the packet to a destination routing node vR 3. When the packet passes through the path from the vR 1 to the vR 2, if a calculated average packet loss rate of the path from the vR 1 to the vR 2 is 0.01, 0.01 is used as a weight value of the path from the vR 1 to the vR 2. Then, the packet passes through the path from the vR 2 to the vR 3. In this case, if a calculated average packet loss rate of the path from the vR 2 to the vR 3 is 0.02, and 1−(1−0.01)×(1−0.02)=0.0298, where 0.0298 is used as a weight value of the path from the vR 2 to the vR 3.

Part 3. Fitting of a Latency and a Packet Loss Rate:

The SDN controller uses, as the weight value of the path, transmission efficiency obtained by multiplying a length of the packet transmitted on the path between every two adjacent routing nodes by a transmission correctness percentage divided by transmission duration of the packet transmitted on the path between every two adjacent routing nodes. In the following description, a path between the first routing node and a reachable adjacent routing node is used as an example. A length of a packet transmitted on the path is denoted as L, transmission duration of the packet transmitted on the path is denoted as T, an average packet loss rate of the path is denoted as $LostRate_{path}$, and transmission efficiency of transmitting the packet on the path is denoted as Q. Then, Q may be represented by a formula (7):

$$Q = L * \frac{1 - LostRate_{path}}{T}. \tag{7}$$

Herein, the transmission duration T of the packet transmitted on the path is a sum of a half of an estimated latency and a value obtained by dividing the length of the packet by a bandwidth B of the path. If the estimated latency of the path is denoted as RTT, T may be represented by a formula (8):

$$T = \frac{L}{B} + \frac{RTT}{2}. \quad (8)$$

It should be noted herein that $LostRate_{path}$ in the formula (7) may be calculated according to the formula (6), and RTT in the formula (8) may be calculated according to the formula (2). Details are not described herein again.

A process in which the SDN controller processes fitting of a latency and a packet loss rate of another path between every two adjacent routing nodes is the same as a process in which the SDN controller processes fitting of the latency and the packet loss rate of the path between the first routing node and the reachable adjacent routing node. Details are not described herein again.

Further, in this embodiment of this application, to make it easier to calculate a routing path according to the Dijkstra's algorithm, a reciprocal of the transmission efficiency may be $$\frac{1}{Q}$$

used as the weight value of the path in a specific implementation process. That is, is used as the weight value of the path. Herein, the path from the vR 1 to the vR 2 in FIG. 5 is still used as an example. The estimated latency of the path from the vR 1 to the vR 2 is 5/6 (ms) according to a calculated result in Part 1. The average packet loss rate of the path from the vR 1 to the vR 2 is 0.01 according to a calculated result in Part 2. If a length L of a packet transmitted on the path is 12 bytes, and a bandwidth B is 256 kilobits per second (kb/s), transmission efficiency Q of the path may be calculated as (1−0.01)/(1/(256×1000)+5/(2×12×8×6)) according to the formula (7) and the formula (8), where a unit of Q is bit/ms. Then, $$\frac{1}{Q},$$

to be specific, (1/(256×1000)+5/(2×12×8×6))/(1−0.01) is used as a weight value of the path.

Part 4. Costs and any QoS Parameter:

The SDN controller uses, as the weight value of the path, a value obtained by adding a product of costs of the path between every two adjacent routing nodes and a fourth weight to a product of a value of any QoS parameter and a fifth weight. A sum of the fourth weight and the fifth weight is 1, and the fourth weight is greater than or equal to 0 and less than or equal to 1. In the following description, a path between the first routing node and a reachable adjacent routing node is used as an example. If a fourth weight of the path is denoted as β, then a fifth weight may be represented as 1−β. If any QoS parameter is denoted as S, and costs of the path between every two adjacent routing nodes are denoted as C, a cost function W of the path may be represented using a formula (9):

$$W = \beta * C + (1-\beta) * S. \quad (9)$$

Figure 7:
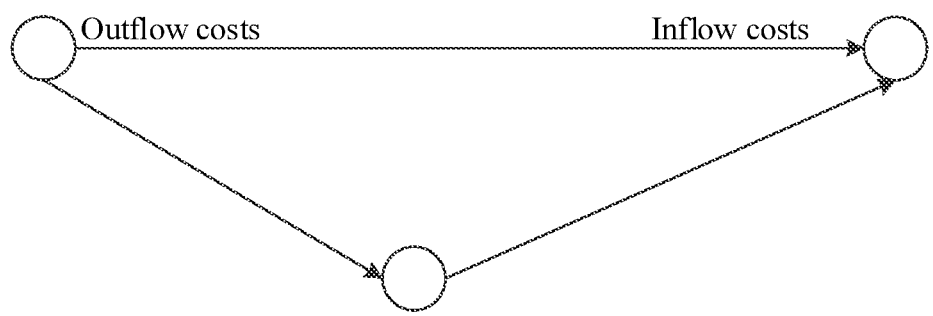
FIG. 7 is a schematic diagram of costs of a path between every two adjacent routing nodes according to an embodiment of this application.

The path from the vR 1 to the vR 2 in FIG. 5 is used as an example. Costs C of the path from the vR 1 to the vR 2 are a sum of outflow costs generated when a packet is sent by the vR 1 and inflow costs generated when the packet is received by the vR 2. For details, refer to FIG. 7.

A process in which the SDN controller processes costs of another path between every two adjacent routing nodes is the same as a process in which the SDN controller processes costs of the path between the first routing node and the reachable adjacent routing node. Details are not described herein again.

In this embodiment of this application, when each routing node reports a measured QoS parameter set to the SDN controller in real time, the SDN controller may calculate the routing path from each routing node to another routing node in real time. Alternatively, the SDN controller may calculate the routing path from each routing node to another routing node according to a specific period. Alternatively, the SDN controller may calculate the routing path from each routing node to another routing node when a difference between a value of at least one QoS parameter in the QoS parameter set and a previously reported value of the QoS parameter is greater than a preset threshold, to avoid route flapping.

When each routing node periodically reports a measured QoS parameter set to the SDN controller, the SDN controller may calculate the routing path from each routing node to another routing node according to a period that is the same as a reporting period of each routing node. Alternatively, the SDN controller may calculate the routing path from each routing node to another routing node according to a period that is different from a reporting period. Alternatively, the SDN controller may calculate the routing path from each routing node to another routing node when a difference between a value of at least one QoS parameter in the QoS parameter set and a previously reported value of the QoS parameter is greater than a preset threshold, to avoid route flapping.

In this embodiment of this application, an objective of calculating routing tables of each routing node that are based on different QoS parameters is to satisfy QoS requirements of different packets. Therefore, after routing tables that are of routing performed from each routing node to another routing node and that are based on different QoS parameters are determined, a correspondence between a routing table and an identifier of a packet further needs to be established. Each routing table corresponds to a type of identifier of a packet. For details, refer to FIG. 8A. In this case, after receiving a packet, each routing node can determine a routing path of the packet based on a routing table that satisfies a QoS requirement of the packet, thereby ensuring that the determined routing path can carry transmission of the packet.

In this embodiment of this application, an identifier of a packet may be represented using a 5-tuple, or may be represented using a DSCP. Descriptions are separately provided below.

1. An Identifier of a Packet is Represented Using a 5-Tuple.

Figure 8A:
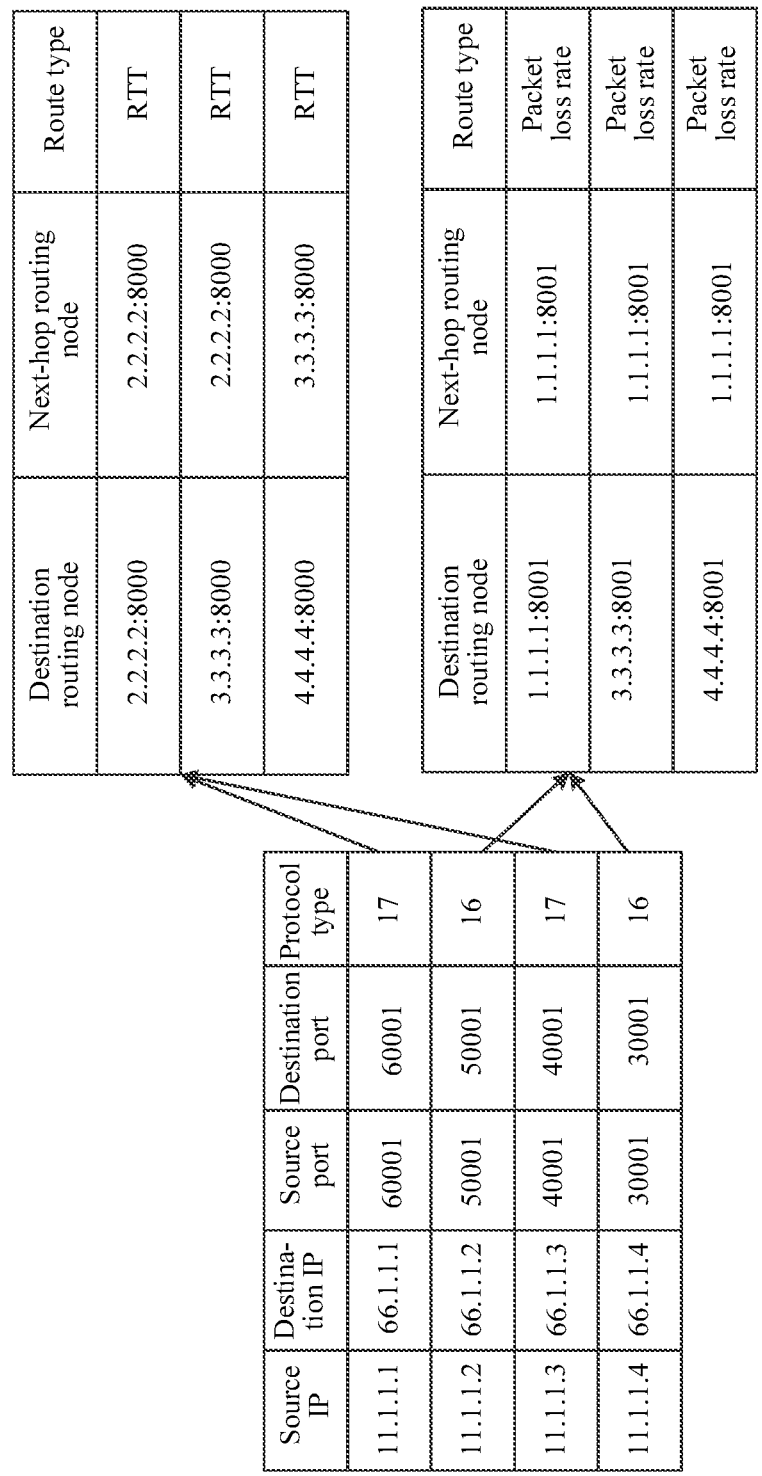
FIG. 8A is a schematic diagram of a correspondence between a routing table and a 5-tuple according to an embodiment of this application.

The 5-tuple includes a source IP, a destination IP, a source port, a destination port, and a protocol type of a packet. Referring to FIG. 8A, for example, an identifier, corresponding to a latency-based routing table, of a packet is a 5-tuple that includes a source IP: 11.1.1.1, a source port: 60001, a destination IP: 66.1.1.1, a destination port: 60001, and a protocol type: 17. An identifier, corresponding to a routing table that is based on a packet loss rate, of a packet is a 5-tuple that includes a source IP: 11.1.1.2, a source port: 50001, a destination IP: 66.1.1.2, a destination port: 50001, and a protocol type: 6.

In this embodiment of this application, it may be required to restrict a port range of an upper-layer user, to improve resource utilization and table lookup performance of each routing node. Upper-layer users having a port within a specified range use a same 5-tuple, to minimize information stored in each routing node.

2. An Identifier of a Packet is Represented Using a DSCP.

In this embodiment of this application, after determining routing tables that are of routing performed from each routing node to another routing node and that are based on different QoS parameters, the SDN controller maps the routing table to a DSCP with a fixed value. For example, referring to FIG. 8B, a routing table that is based on a packet loss rate corresponds to an identifier that is of a packet and that is a DSCP with a value of AF4, a latency-based routing table corresponds to an identifier that is of a packet and that is a DSCP with a value of EF, and a routing table that is based on costs corresponds to an identifier that is of a packet and that is a DSCP with a value of BE. It should be noted herein that a value of a DSCP is represented in two manners: a keyword form and a digital form, where AF4, EF, and BE are keyword forms. Correspondingly, a digital form of AF4 is 100010, a digital form of EF is 101110, and a digital form of BE is 000000.

In this embodiment of this application, an identifier of a packet may be further represented using a ToS in addition to a 5-tuple or a DSCP. Regardless of whether an identifier of a packet is represented by a 5-tuple, a DSCP, or a ToS, these fields are carried in a packet header of a packet.

S404. The SDN controller delivers, to each routing node, one or more routing tables of routing performed from each routing node to another routing node, and each routing node receives the one or more routing tables delivered by the SDN controller.

In this embodiment of this application, the SDN controller delivers, to each routing node, one or more routing tables of routing performed from each routing node to another routing node instead of to another routing node, to improve resource utilization of each routing node. For example, the SDN controller delivers, to the vR 1 instead of to another routing node different from the vR 1, a routing table of routing performed from the vR 1 to another routing node.

In a specific implementation process, the SDN controller delivers, to each routing node, a mapping table or a correspondence between an identifier of a packet and a routing table of routing performed from each routing node to another routing node. In this case, the SDN controller may deliver, to each routing node using the TCP/IP protocol or the OPENFLOW protocol, the one or more routing tables of routing performed from each routing node to another routing node.

The SDN controller sends, to each routing node, the one or more routing tables of routing performed from each routing node to another routing node such that after receiving a packet, each routing node determines, from the received one or more routing tables, a routing table corresponding to an identifier of the received packet, and then forwards the received packet based on the routing table. The following uses an example in which the first routing node receives one or more routing tables delivered by the SDN controller, to describe a process in which the first routing node forwards a received packet based on the received one or more routing tables. A process in which another routing node that is in the routing nodes and that is different from the first routing node forwards a received packet sent by a source service POP is the same as that of the first routing node. Details are not described herein again.

S405. The first routing node receives a packet, determines, from the one or more routing tables, a routing table corresponding to an identifier of the packet, and forwards the received packet based on the routing table.

In this embodiment of this application, each routing node can determine, based on the routing table corresponding to the identifier of the packet, a routing path used to forward the packet. To be specific, the determined routing path can satisfy the QoS requirement of the received packet and can carry transmission of the packet.

In a specific implementation process, in addition to receiving the one or more routing tables delivered by the SDN controller, the first routing node further receives a correspondence that is between a service POP and a routing node and that is delivered by the SDN controller. Correspondingly, the first routing node also needs to report, to the SDN controller, a service POP corresponding to the first routing node. For example, the vR 1 reports, to the SDN controller, a service POP 11, a service POP 12, and a service POP 13 that belong to the vR 1. Certainly, another routing node that is in the routing nodes controlled by the SDN controller and that is different from the first routing node may also report, to the SDN controller, a service POP that belongs to the other routing node. For example, the vR 2 reports a service POP 21, a service POP 22, and a service POP 23 that belong to the vR 2 to the SDN controller, . . . , the vR 7 reports a service POP 71, a service POP 72, and a service POP 73 that belong to the vR 7 to the SDN controller. In this embodiment of this application, the first routing node may alternatively report, to the SDN controller, an identifier that is used to represent a service POP. The identifier may be an IP address of the service POP. After receiving the service POP reported by each routing node, the SDN controller establishes a correspondence between a routing node and a service POP. For details, refer to FIG. 9.

The following mainly describes a process in which the first routing node forwards the received packet.

In this embodiment of this application, the first routing node determines, based on the correspondence between a service POP and a routing node, a destination routing node corresponding to a destination service POP of the packet, and determines, from the one or more routing tables, a routing table corresponding to an identifier of the packet. That is, the first routing node determines a routing table corresponding to an identifier of the packet based on the correspondence in FIG. 8A. For the two steps, the destination routing node may be first determined, and then the routing table corresponding to the identifier of the packet is determined. Alternatively, the routing table corresponding to the identifier of the packet may be first determined, and then the destination routing node is determined. Alternatively, the two steps may be performed simultaneously. This is not limited herein.

After the routing table corresponding to the identifier of the packet is determined, a second routing node through which the received packet can reach the destination routing node is determined from the routing table corresponding to the identifier of the packet, and then the first routing node forwards the received packet to the second routing node. That is, the first routing node determines, from the routing table corresponding to the identifier of the packet, a next-hop routing node through which the received packet can reach the destination routing node, and then forwards the received packet to the next-hop routing node.

In this embodiment of this application, because the determined routing table corresponds to the identifier of the received packet, the determined routing table correspond to the QoS requirement of the received packet. Correspondingly, the routing path determined based on the routing table can satisfy the QoS requirement of the received packet. That is, the routing path determined based on the routing table can carry transmission of the received packet.

Before forwarding the received packet, the first routing node may perform tunnel encapsulation on the received packet based on the second routing node. Further, the first routing node may perform encapsulation using a tunnel encapsulation protocol in the other approaches, for example, a Virtual Extensible local area network (LAN) (VXLAN) or Generic Routing Encapsulation (GRE), or may perform encapsulation using another tunnel encapsulation protocol.

This embodiment of this application provides another tunnel encapsulation protocol. After the packet is encapsulated using the other tunnel encapsulation protocol, a tunnel-encapsulated packet carries a route type. In this case, after receiving the tunnel-encapsulated packet, the second routing node may determine a routing table corresponding to the packet based on the route type carried in a tunnel header. The correspondence in FIG. 8A is not needed to determine the routing table corresponding to the identifier of the packet, thereby reducing a forwarding latency of the packet.

In this embodiment of this application, the route type carried in the tunnel-encapsulated packet may be a QoS parameter such as a latency or a packet loss rate, or QoS parameters such as a combination of a latency and a packet loss rate, or may be costs.

In a specific implementation process, in addition to carrying a route type, the tunnel-encapsulated packet may further include another field such as Version: a version number, PhLen: a length of a tunnel header, All Ph Len: lengths of all headers, TTL: used to indicate a specific routing node at which a packet is lost, HashKey: a hash value, ToS: used to indicate a feature of a packet, Nheader: a type of an extension header, or Ph CheckSum: a checksum of a header. In this embodiment of this application, reliability of forwarding the packet can be improved by adding these fields. For example, HashKey is used to perform a hash operation on a packet to obtain a hash value. The hash value may be invoked for use during load sharing, and TTL may be used to avoid a packet loop. Based on the foregoing description, FIG. 10 shows a format of a tunnel encapsulation according to an embodiment of this application.

As shown in FIG. 10, a tunnel encapsulation format further includes a conventional field, an IP packet header and a User Datagram Protocol (UDP) packet header. The IP packet header and the UDP packet header have a total length of 28 bytes. The IP header includes a source IP address, to be specific, an IP address of the first routing node that receives a packet sent by a service POP, and a destination IP address, to be specific, an IP address of a next-hop routing node through which a destination routing node corresponding to a destination service POP of the packet is reached, which is also referred to as an IP address of the second routing node. The UDP packet header carries a source port number, to be specific, a port number of the first routing node that receives a packet sent by a service POP, and a destination port number, to be specific, a port number of a next-hop routing node through which a destination routing node corresponding to a destination service POP of the packet is reached, which is also referred to as a port number of the second routing node.

The following describes, with reference to a specific example, the process in which the first routing node forwards the received packet. In the following description, an example in which the first routing node is the vR 1, the vR 1 receives a packet sent by the service POP 11, and a destination service POP of the packet is the service POP 31 is used.

Figure 11:
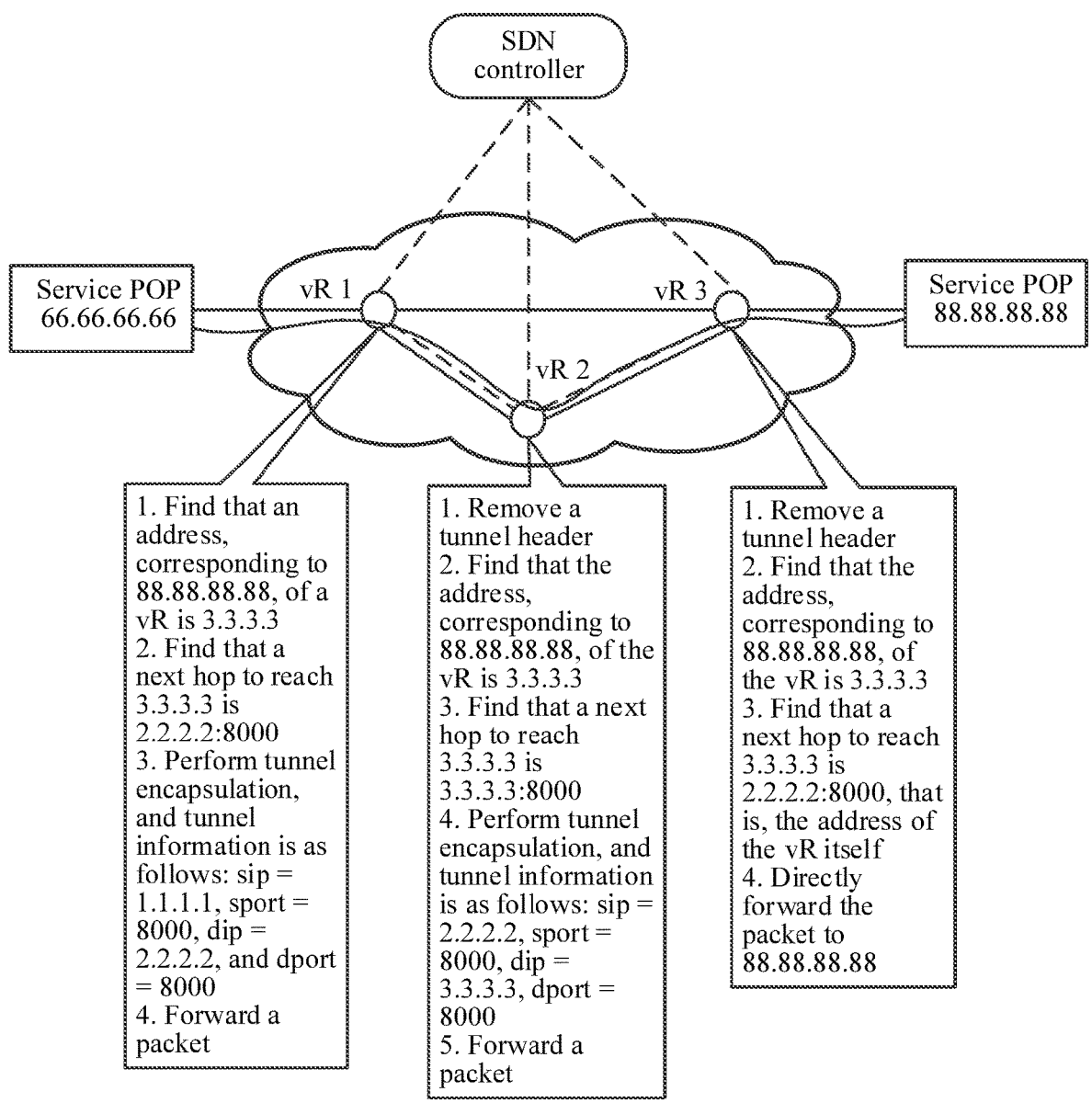
FIG. 11 is a schematic diagram of forwarding a received packet by a virtual router (vR) 1 according to an embodiment of this application.

Referring to FIG. 11, a packet sent by the service POP 11 carries an IP address of the service POP 11 and an IP address of the service POP 31. The IP address of the service POP 11 is 66.66.66.66, the IP address of the service POP 31 is 88.88.88.88, and an IP address of the routing node vR 1 that corresponds to the service POP 11 is 1.1.1.1. After receiving the packet sent by the service POP 11, the vR 1 determines, based on the correspondence between a service POP and a routing node, a destination routing node corresponding to the service POP 31, that is, the vR 3 in FIG. 11. An IP address of the vR 3 is 3.3.3.3.

The vR 1 further needs to parse the received packet to obtain an identifier of the packet. For example, a DSCP field in a packet header is checked, a ToS field in a packet header is checked, or 5-tuple information carried in a packet header is checked. In this case, an example in which the DSCP field in the packet header is checked, and a determined value of the DSCP is EF is used. It should be noted herein that before the service POP 11 sends a packet to the vR 1, the service POP 11 reports, using an application server or an application process, a QoS requirement of the packet that is to be sent to the SDN controller. For example, the reported QoS requirement indicates a higher priority of a latency requirement, or a higher requirement of a packet loss rate, or a higher priority of cost requirement. An example in which a priority of a latency requirement is higher is used. After receiving the QoS requirement, the SDN controller returns a value, such as EF, that is of the DSCP and that corresponds to the QoS requirement to the service POP 11. The service POP 11 adds the value of the DSCP to the packet header based on the value of the DSCP, and then sends the packet to the vR 1.

After determining the value of the DSCP, the vR 1 determines, from the one or more routing tables, a routing table corresponding to the identifier of the packet based on the correspondence in FIG. 8B. That is, the vR 1 determines a routing table corresponding to EF. Then, the vR 1 determines a second routing node, that is, a routing node whose IP address is 2.2.2.2 and port number is 8000 in FIG. 11 and through which the received packet can reach the destination routing node. After determining the second routing node, the vR 1 performs encapsulation on the packet using the tunnel encapsulation format described in FIG. 10. An IP packet header includes a source IP address: 1.1.1.1 and a destination IP address: 2.2.2.2. A UDP packet header includes a source port number: 8000 and a destination port number: 8000. Corresponding content is added to another field. Details are not described herein again.

After performing tunnel encapsulation on the received packet, the vR 1 forwards a tunnel-encapsulated packet to the second routing node. After receiving the tunnel-encapsulated packet, the second routing node removes a tunnel header of the received tunnel-encapsulated packet, and determines whether the destination routing node is the second routing node based on the destination routing node that corresponds to the destination service POP and that is carried in the packet header of the packet. If the destination routing node is not the second routing node, the second routing node directly determines a routing table corresponding to a route type based on the route type carried in a tunnel header, to determine, from the routing table of the route type, a next-hop routing node through which the received packet can reach the destination routing node. The next-hop routing node herein is a next-hop routing node, namely, the vR 3 in FIG. 11, of the second routing node. An IP address of the vR 3 is 3.3.3.3. The second routing node performs, based on the next-hop routing node, encapsulation on the packet using the tunnel encapsulation format described in FIG. 10. An IP packet header includes a source IP address: 2.2.2.2 and a destination IP address: 3.3.3.3. A UDP packet header includes a source port number: 8000 and a destination port number: 8000. When performing encapsulation on the packet, the second routing node may further modify another field in the tunnel header according to an actual requirement. For example, a value of TTL decreases by 1 each time the packet is forwarded. After performing tunnel encapsulation on the packet, the second routing node vR 2 forwards the tunnel-encapsulated packet to the vR 3. After receiving the tunnel-encapsulated packet, the vR 3 removes a tunnel header of the tunnel-encapsulated packet and determines whether the destination routing node is the vR 3 based on the destination routing node that corresponds to the destination service POP and that is carried in the packet header of the packet. If the destination routing node is the vR 3, the vR 3 forwards the packet to the destination service POP, that is, the service POP 31 that corresponds to an IP address: 88.88.88.88 in FIG. 11.

Devices provided in embodiments of this application are described below with reference to the accompanying drawings.

Figure 12:
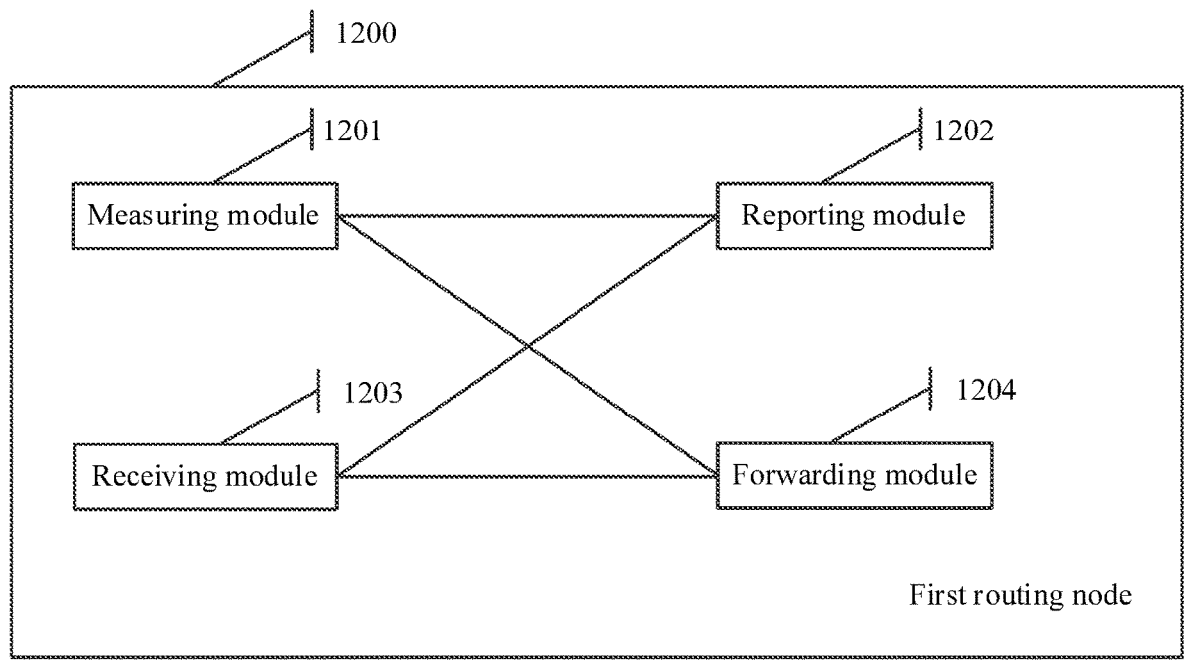
FIG. 12 is a schematic structural diagram of a first routing node according to an embodiment of this application.

FIG. 12 is a schematic structural diagram of a first routing node 1200. The first routing node 1200 may include a measuring module 1201, a reporting module 1202, a receiving module 1203, and a forwarding module 1204. The measuring module 1201 may be configured to perform S401 in the embodiment in FIG. 4, and/or support another process of the technology described in this specification. The reporting module 1202 may be configured to perform S402 in the embodiment in FIG. 4, and/or support another process of the technology described in this specification. The receiving module 1203 may be configured to perform S404 in the embodiment in FIG. 4, and/or support another process of the technology described in this specification. The forwarding module 1204 may be configured to perform S405 in the embodiment in FIG. 4, and/or support another process of the technology described in this specification. All related content of the steps in the foregoing method embodiment may be cited in function descriptions of corresponding function modules. Details are not described herein again.

Figure 13:
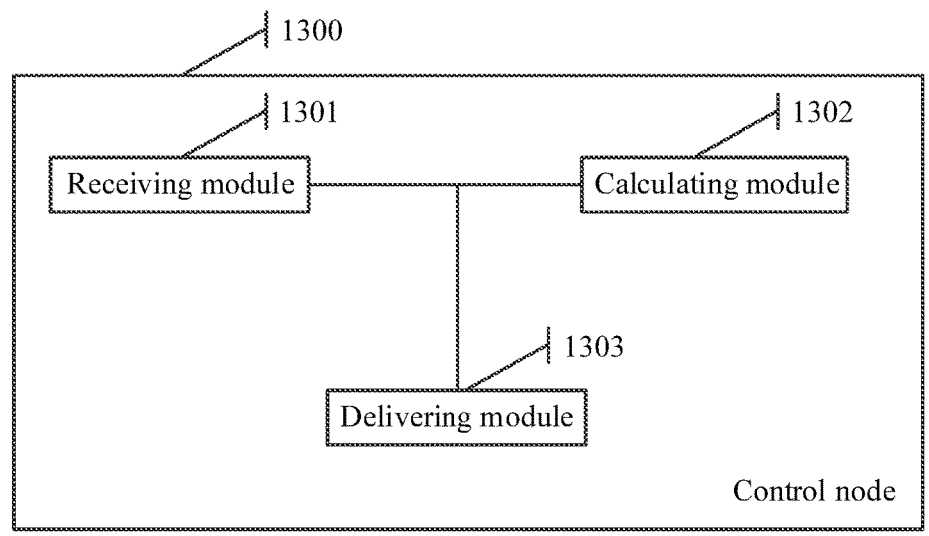
FIG. 13 is a schematic structural diagram of a control node according to an embodiment of this application.

FIG. 13 is a schematic structural diagram of a control node 1300. The control node 1300 may include a receiving module 1301, a calculating module 1302, and a delivering module 1303. The receiving module 1301 may be configured to perform S402 in the embodiment in FIG. 4, and/or support another process of the technology described in this specification. The calculating module 1302 may be configured to perform S403 in the embodiment in FIG. 4, and/or support another process of the technology described in this specification. The delivering module 1303 may be configured to perform S404 in the embodiment in FIG. 4, and/or support another process of the technology described in this specification. All related content of the steps in the foregoing method embodiment may be cited in function descriptions of corresponding function modules. Details are not described herein again.

Figure 14:
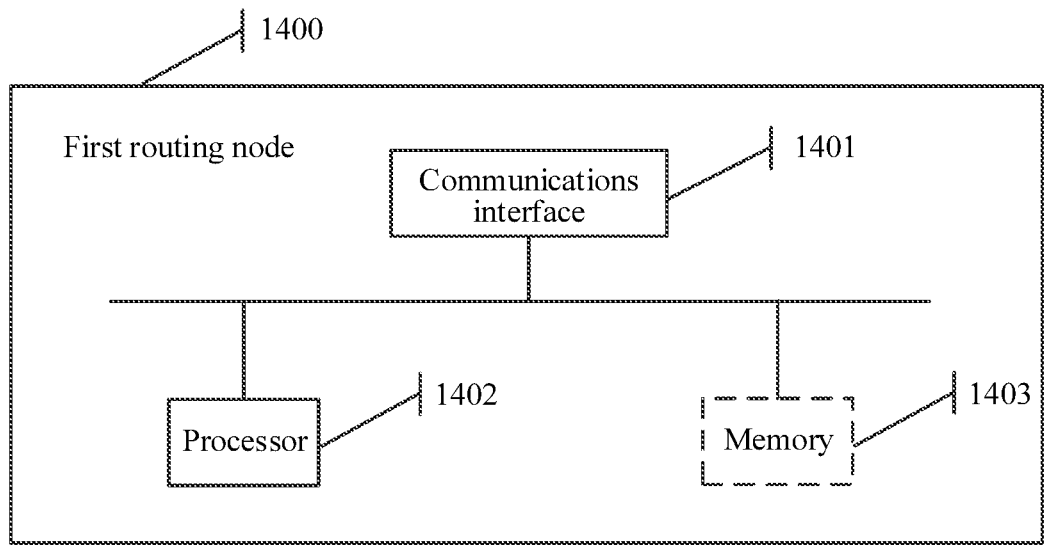
FIG. 14 is a schematic structural diagram of another first routing node according to an embodiment of this application.

FIG. 14 is a schematic structural diagram of a first routing node 1400. The first routing node 1400 may include a communications interface 1401, a processor 1402, and a memory 1403. The processor 1402 is coupled to the memory 1403 and the communications interface 1401. The processor 1402 may be a central processing unit (CPU) or an application-specific integrated circuit (ASIC), may be one or more integrated circuits configured to control execution of a program, may be a baseband chip, or the like. There may be one or more memories. The memory may be a read-only memory (ROM), a random-access memory (RAM), a magnetic disk memory, or the like. The memory 1403 is configured to store a computer executable instruction. When the first routing node 1400 is operating, the processor 1402 executes the computer executable instruction stored in the memory 1403 such that the first routing node 1400 implements the routing method that is based on QoS and that is provided in the embodiment in FIG. 4. For a specific routing method based on QoS, refer to the foregoing descriptions and related descriptions in the accompanying drawings. Details are not described herein again.

Figure 15:
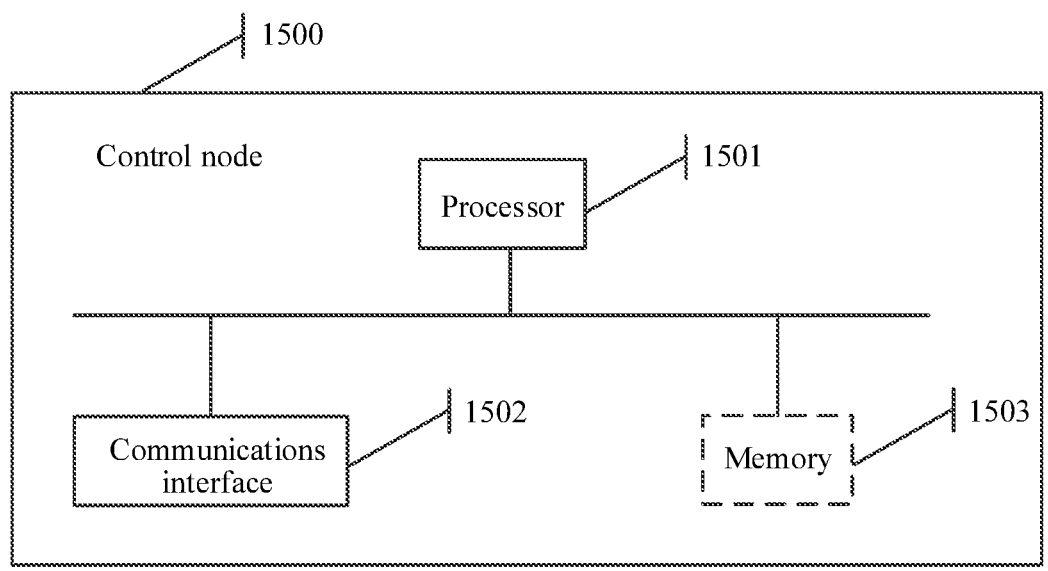
FIG. 15 is a schematic structural diagram of another control node according to an embodiment of this application.

FIG. 15 is a schematic structural diagram of a control node 1500. The control node 1500 may include a processor 1501, a communications interface 1502, and a memory 1503. The processor 1501 is coupled to the communications interface 1502 and the memory 1503. The processor 1501 may be a CPU or an ASIC, may be one or more integrated circuits configured to control execution of a program, may be a baseband chip, or the like. There may be one or more memories. The memory may be a ROM, a RAM, a magnetic disk memory, or the like. The memory 1503 is configured to store a computer executable instruction. When the control node 1500 is operating, the processor 1501 executes the computer executable instruction stored in the memory 1503 such that the first routing node 1500 implements the routing method that is based on QoS and that is provided in the embodiment in FIG. 4. For a specific routing method based on QoS, refer to the foregoing descriptions and related descriptions in the accompanying drawings. Details are not described herein again.

An embodiment of this application further provides a computer storage medium. The storage medium may include a memory, and the memory may store a program. When the program is executed, all steps performed by the first routing node and the SDN controller described in the method embodiment in FIG. 4 are performed.

An embodiment of this application further provides a computer program product. When the program product is invoked and executed by a computer, the computer is enabled to execute the method provided in the method embodiment in FIG. 4.

An embodiment of this application further provides a chip system. The chip system includes a processor configured to support a first routing node or one of routing nodes, and an SDN controller in implementing the method provided in the embodiment in FIG. 4, for example, generating or processing data and/or information in the method provided in the embodiment in FIG. 4. The chip system further includes a memory, where the memory is configured to store a program instruction and data that are necessary for the first routing node or the one of routing nodes, and the SDN controller. The processor in the chip system may invoke the program instruction and the data that are stored in the memory in the chip system such that the chip system can implement functions that can be implemented by the first routing node or the one of routing nodes, and the SDN controller. The chip system may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc ROM (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine such that the instructions executed by the computer or the processor of the other programmable data processing device generate an apparatus for implementing a specific function in one or more processes in the flowcharts and/or in one or more blocks in the block diagrams.

Alternatively, these computer program instructions may be stored in a computer readable memory that can instruct a computer or another programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

Alternatively, these computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

A person skilled in the art can make various modifications and variations to the embodiments of this application without departing from the scope of the embodiments of this application. This application is also intended to cover these modifications and variations to embodiments of this application provided that they fall within the scope of protection defined by the following claims and their equivalent technologies.

What is claimed is:

1. A routing method comprising:
    performing, by a first routing node controlled by a control node, a quality of service (QoS) measurement on paths between the first routing node and reachable adjacent routing nodes to obtain a QoS parameter set;
    reporting, by the first routing node, the QoS parameter set to the control node to enable the control node to calculate a routing path from the first routing node to a second routing node controlled by the control node and different from the first routing node;
    receiving, by the first routing node, from the control node, and in response to the QoS parameter set, one or more routing tables of routing performed from the first routing node to the second routing node;
    receiving, by the first routing node, a packet comprising an identifier;
    determining, by the first routing node, a routing table corresponding to the identifier from the one or more routing tables, wherein the identifier indicates a QoS requirement of the packet; and
    forwarding, by the first routing node, the packet based on the routing table.

2. The routing method of claim 1, further comprising:
    setting, by the control node, a first value of each QoS parameter of the QoS parameter set as a weight value of a corresponding path; and
    substituting, by the control node, weight values that correspond to a same QoS parameter into a Dijkstra's algorithm to obtain routing paths of different route types from the first routing node to the second routing node, wherein the routing table is based on the routing paths of the different route types after the setting and substituting.

3. The routing method of claim 2, wherein each of the QoS parameters comprises one or more of a latency, a packet loss rate, or a jitter, and wherein obtaining the weight value of the corresponding path comprises:
    setting, by the control node as the weight value of the corresponding path, an estimated latency obtained by adding a product of a current latency of the corresponding path and a first weight to a product of a historical latency of the corresponding path and a second weight, wherein a sum of the first weight and the second weight is 1, and wherein the first weight is a constant or a ratio of a jitter to an average latency of the corresponding path;
    setting, by the control node as the weight value of the corresponding path, an average packet loss rate of the corresponding path, wherein each item for calculating the average packet loss rate is a product of a third weight and a packet loss rate that is obtained through each measurement, and wherein the third weight is a sum of 1 and a ratio of a maximum quantity of continuously lost packets to a total quantity of sent data packets in each measurement process;
    setting, by the control node as the weight value of the corresponding path, a transmission efficiency obtained by multiplying a length of the packet by a transmission correctness percentage divided by a transmission duration of the packet transmitted on the corresponding path, wherein the transmission duration is a sum of a half of the estimated latency of the corresponding path and a second value obtained by dividing the length of the packet by a bandwidth of the corresponding path, and wherein the transmission correctness percentage is a difference obtained by subtracting the average packet loss rate from 1; or
    setting, by the control node as the weight value of the corresponding path, a third value obtained by adding a product of costs of the corresponding path and a fourth weight to a product of a fourth value of any QoS parameter and a fifth weight, wherein a sum of the fourth weight and the fifth weight is 1, and wherein the fourth weight is greater than or equal to zero and less than or equal to 1.

4. The routing method of claim 1, wherein forwarding the packet comprises:

determining, by the first routing node, a destination routing node corresponding to a destination service point of presence (POP) of the packet based on a correspondence that is between a service POP and a routing node and that is received from the control node;

determining, by the first routing node from the routing table, a third routing node through which the destination routing node can be reached; and forwarding, by the first routing node, the packet to the third routing node.

5. The routing method of claim 4, wherein forwarding the packet to the third routing node comprises:

performing, by the first routing node, tunnel encapsulation on the packet based on the third routing node to obtain a tunnel-encapsulated packet, wherein the tunnel-encapsulated packet carries a route type; and forwarding, by the first routing node, the tunnel-encapsulated packet to the third routing node to enable the third routing node to determine, based on the route type, a routing table that satisfies the QoS requirement of the packet.

6. The routing method of claim 1, wherein the identifier is any one of a 5-tuple, a differentiated services code point (DSCP), or a type of service (ToS).

7. A routing method implemented by a control node, wherein the routing method comprises:

receiving, from each routing node, a quality of service (QoS) parameter set that is based on a QoS measurement on paths between a corresponding routing node and reachable adjacent routing nodes;

calculating a routing path from the corresponding routing node to a second routing node based on the QoS parameter set, wherein the second routing node is controlled by the control node and different from the corresponding routing node; and sending, to the corresponding routing node, one or more routing tables of routing performed from the corresponding routing node to the second routing node to enable the corresponding routing node to determine, after receiving a packet, a routing table corresponding to an identifier of the packet from the one or more routing tables, and to forward the packet based on the routing table, wherein the identifier of the packet indicates a QoS requirement of the packet.

8. The routing method of claim 7, wherein calculating the routing path from the corresponding routing node to the second routing node comprises:

setting a first value of each QoS parameter of the QoS parameter set as a weight value of the corresponding path; and substituting weight values that correspond to a same QoS parameter into a Dijkstra's algorithm to obtain routing paths that are of different route types and that are from the corresponding routing node to the second routing node.

9. The routing method of claim 8, wherein the QoS parameter comprises one or more of a latency, a packet loss rate, or a jitter, and wherein setting the first value of each QoS parameter as the weight value of the corresponding path comprises:

obtaining an estimated latency by adding a product of a current latency of the corresponding path and a first weight to a product of a historical latency of the corresponding path and a second weight, wherein a sum of the first weight and the second weight is 1, and wherein the first weight is a constant or a ratio of a jitter to an average latency of the corresponding path, and setting the estimated latency as the weight value of the corresponding path;

setting, as the weight value of the corresponding path, an average packet loss rate of the corresponding path, wherein each item for calculating the average packet loss rate is a product of a third weight and a packet loss rate that is obtained through each measurement, and wherein the third weight is a sum of 1 and a ratio of a maximum quantity of continuously lost packets to a total quantity of sent data packets in each measurement process;

obtaining a transmission efficiency by multiplying a length of the packet transmitted on the corresponding path by a transmission correctness percentage divided by a transmission duration of the packet transmitted on the corresponding path, wherein the transmission duration is a sum of a half of the estimated latency and a second value obtained by dividing the length of the packet transmitted on the corresponding path by a bandwidth of the corresponding path, and wherein the transmission correctness percentage is a first difference of subtracting the average packet loss rate from 1, and setting the transmission efficiency as the weight value of the corresponding path; or obtaining a third value by adding a product of costs of the corresponding path and a fourth weight to a product of a fourth value of any QoS parameter and a fifth weight, wherein a sum of the fourth weight and the fifth weight is 1, and wherein the fourth weight is greater than or equal to zero and less than or equal to 1, and setting the third value as the weight value of the corresponding path.

10. The routing method of claim 9, wherein setting the average packet loss rate as the weight value of the corresponding path comprises obtaining a second difference by subtracting, from 1, a product of the transmission correctness percentage and transmission correctness percentages of all paths passed through by the packet transmitted on the corresponding path before the packet reaches the corresponding path, and setting the second difference as the weight value of the corresponding path; or wherein setting the transmission efficiency as the weight value of the corresponding path comprises setting a reciprocal of the transmission efficiency as the weight value of the corresponding path.

11. The routing method of claim 7, further comprising sending, to the corresponding routing node, a correspondence between a service point of presence (POP) and a routing node to enable the corresponding routing node to determine a destination routing node corresponding to a destination service POP of the packet based on the correspondence, to determine, from the routing table, a next-hop routing node through which the destination routing node can be reached, and to forward the packet to the next-hop routing node.

12. The routing method of claim 7, wherein the identifier of the packet is any one of a 5-tuple, a differentiated services code point (DSCP), or a type of service (ToS).

13. A first routing node controlled by a control node, wherein the first routing node comprises:

a processor configured to perform a quality of service (QoS) measurement on paths between the first routing node and reachable adjacent routing nodes of the first routing node to obtain a QoS parameter set; and a communications interface coupled to the processor and configured to:

report the QoS parameter set to the control node to enable the control node to calculate a routing path from the first routing node to a second routing node controlled by the control node and different from the first routing node;

receive, from the control node, and in response to the QoS parameter set, one or more routing tables of routing performed from the first routing node to the second routing node; and receive a packet comprising an identifier, wherein the processor is further configured to determine, from the one or more routing tables, a routing table corresponding to the identifier, wherein the identifier indicates a QoS requirement of the packet, and wherein the communications interface is further configured to forward the packet based on the routing table.

14. The first routing node of claim 13, wherein the QoS parameter set enables the control node to set a first value of each QoS parameter of the QoS parameter set as a weight value of a corresponding path, and to substitute weight values that correspond to a same QoS parameter into a Dijkstra's algorithm to obtain, through calculation, routing paths that are of different route types and that are from the first routing node to the second routing node, wherein the routing table is based on the routing paths of the different route types after the setting and substituting.

15. The first routing node of claim 14, wherein each of the QoS parameters comprises one or more of a latency, a packet loss rate, or a jitter, and wherein the weight value of the corresponding path is obtained in the following manner:

set, by the control node as the weight value of the corresponding path, an estimated latency obtained by adding a product of a current latency of the corresponding path and a first weight to a product of a historical latency of the corresponding path and a second weight, wherein a sum of the first weight and the second weight is 1, and wherein the first weight is a constant or a ratio of a jitter to an average latency of the corresponding path;

set, by the control node as the weight value of the corresponding path, an average packet loss rate of the corresponding path, wherein each item for calculating the average packet loss rate is a product of a third weight and a packet loss rate that is obtained through each measurement, and wherein the third weight is a sum of 1 and a ratio of a maximum quantity of continuously lost packets to a total quantity of sent data packets in each measurement process;

set, by the control node as the weight value of the path, a transmission efficiency obtained by multiplying a length of the packet by a transmission correctness percentage divided by transmission duration of the packet transmitted on the corresponding path, wherein the transmission duration is a sum of a half of the estimated latency and a second value obtained by dividing the length of the packet by a bandwidth of the corresponding path, and wherein the transmission correctness percentage is a difference obtained by subtracting the average packet loss rate from 1; or set, by the control node as the weight value of the path, a third value obtained by adding a product of costs of the corresponding path and a fourth weight to a product of a fourth value of any QoS parameter and a fifth weight, wherein a sum of the fourth weight and the fifth weight is 1, and wherein the fourth weight is greater than or equal to zero and less than or equal to 1.

16. The first routing node of claim 13, wherein the processor is further configured to:

determine a destination routing node corresponding to a destination service point of presence (POP) of the packet based on a correspondence that is between a service POP and a routing node received from the control node; and determine, from the routing table, a third routing node through which the destination routing node can be reached, and wherein the communications interface is further configured to forward the packet to the third routing node.

17. A control node comprising:

a communications interface configured to receive, from each routing node, a quality of service (QoS) parameter set based on a QoS measurement on paths between a corresponding routing node and reachable adjacent routing nodes; and a processor coupled to the communications interface and configured to calculate a routing path from the corresponding routing node to a second routing node based on the QoS parameter set, wherein the second routing node is controlled by the control node and different from the corresponding routing node, wherein the communications interface is further configured to send, to the corresponding routing node, one or more routing tables of routing performed from the corresponding routing node to the second routing node to enable the corresponding routing node to determine, after receiving a packet, a routing table corresponding to an identifier of the packet from the one or more routing tables, and to forward the packet based on the routing table, and wherein the identifier of the packet indicates a QoS requirement of the packet.

18. The control node of claim 17, wherein when calculating the routing path, the processor is further configured to:

set a first value of each QoS parameter of the QoS parameter set as a weight value of the corresponding path; and substitute weight values that correspond to a same QoS parameter into a Dijkstra's algorithm to obtain routing paths that are of different route types and that are from the corresponding routing node to the second routing node.

19. The control node of claim 18, wherein each of the QoS parameters comprises one or more of a latency, a packet loss rate, or a jitter, and wherein when setting the first value of each QoS parameter as the weight value of the corresponding path, the processor is further configured to:

obtain an estimated latency by adding a product of a current latency of the corresponding path and a first weight to a product of a historical latency of the corresponding path and a second weight, wherein a sum of the first weight and the second weight is 1, and wherein the first weight is a constant or a ratio of a jitter to an average latency of the corresponding path, and set the estimated latency as the weight value of the corresponding path;

set, as the weight value of the path, an average packet loss rate of the corresponding path, wherein each item for calculating the average packet loss rate is a product of a third weight and a packet loss rate that is obtained through each measurement, and wherein the third weight is a sum of 1 and a ratio of a maximum quantity of continuously lost packets to a total quantity of sent data packets in each measurement process;

obtain a transmission efficiency by multiplying a length of the packet transmitted on the corresponding path by a transmission correctness percentage divided by a transmission duration of the packet transmitted on the corresponding path, wherein the transmission duration is a sum of a half of the estimated latency and a second value obtained by dividing the length of the packet transmitted on the corresponding path by a bandwidth of the corresponding path, and wherein the transmission correctness percentage is a first difference obtained by subtracting the average packet loss rate from 1, and set the transmission efficiency as the weight value of the corresponding path; or obtain a third value by adding a product of costs of the corresponding path and a fourth weight to a product of a fourth value of any QoS parameter and a fifth weight, wherein a sum of the fourth weight and the fifth weight is 1, and wherein the fourth weight is greater than or equal to zero and less than or equal to 1, and set the third value as the weight value of the corresponding path.

20. The control node of claim 19, wherein when setting the average packet loss rate as the weight value of the corresponding path, the processor is further configured to obtain a second difference by subtracting, from 1, a product of the transmission correctness percentage and transmission correctness percentages of all paths passed through by the packet transmitted on the corresponding path before the packet reaches the corresponding path, and set the second difference as the weight value of the corresponding path; or wherein when setting the transmission efficiency as the weight value of the corresponding path, the processor is further configured to set a reciprocal of the transmission efficiency as the weight value of the corresponding path.

* * * * *